US012613955B2

(12) United States Patent     (10) Patent No.:   US 12,613,955 B2

Desai et al.     (45) Date of Patent:   Apr. 28, 2026

(54) IDENTITY THREAT DETECTION AND RESPONSE

(71) Applicant: Zscaler, Inc., San Jose, CA (US)

(72) Inventors: Deepen Desai, San Ramon, CA (US);
Akshay Shah, Mumbai (IN); Pranit Patel, Mumbai (IN); Sudarshan Pisupati, Mumbai (IN); Amir Moin, Uttar Pradesh (IN); Bhavesh Kothari, Mumbai (IN); Sahir Hidayatullah, Mumbai (IN)

(73) Assignee: Zscaler, Inc., San Jose, CA (US)

( * ) Notice: Subject to any disclaimer, the term of this patent is extended or adjusted under 35 U.S.C. 154(b) by 218 days.

(21) Appl. No.: 18/502,268

(22) Filed: Nov. 6, 2023

(65) Prior Publication Data

US 2024/0419787 A1     Dec. 19, 2024

Related U.S. Application Data

(60) Provisional application No. 63/508,063, filed on Jun. 14, 2023.

(51) Int. Cl.
| | |
|---|---|
| *G06F 21/55* | (2013.01) |
| *G06F 21/57* | (2013.01) |
| *H04L 9/40* | (2022.01) |

(52) U.S. Cl.
CPC .......... *G06F 21/552* (2013.01); *G06F 21/577* (2013.01); *H04L 63/1433* (2013.01); *H04L 63/20* (2013.01)

(58) Field of Classification Search
CPC . G06F 21/552; G06F 21/577; H04L 63/1433; H04L 63/20
See application file for complete search history.

(56) References Cited

U.S. PATENT DOCUMENTS

| | | | |
|---|---|---|---|
| 10,142,362 B2 | 11/2018 | Weith et al. | |
| 10,419,477 B2 | 9/2019 | Desai et al. | |
| 10,498,605 B2 | 12/2019 | Weith et al. | |
| 10,904,274 B2 | 1/2021 | Weith et al. | |
| 11,627,148 B2 | 4/2023 | Desai | |
| 11,755,726 B2 | 9/2023 | Ma et al. | |
| 11,770,398 B1 * | 9/2023 | Erlingsson .......... | G06F 16/3329 709/224 |
| 12,126,643 B1 * | 10/2024 | Skarphedinsson ........................... | H04L 63/1441 |
| 12,299,472 B2 * | 5/2025 | Kaimal ................... | H04L 43/50 |
| 2020/0028879 A1 * | 1/2020 | Lahiri ..................... | H04L 63/10 |
| 2021/0105289 A1 | 4/2021 | Desai et al. | |

(Continued)

*Primary Examiner* — Linglan Edwards
*Assistant Examiner* — Jacob Benedict Knackstedt
(74) *Attorney, Agent, or Firm* — Baratta Law PLLC; Lawrence A. Baratta, Jr.

(57) ABSTRACT

Systems and methods are provided for protecting identity information in a directory, such as Active Directory. A method, according to one implementation, include the step of conducting a scan of a directory of a network domain to gain visibility of one or more vulnerabilities of the directory. The one or more vulnerabilities define a potential security risk that would allow an attacker to leverage identity-related information from the directory. The method further includes the step of guiding an administrator regarding management of the directory to reduce the potential security risk. Also, the method includes the step of monitoring the directory for one or more attacks to leverage the identity-related information.

20 Claims, 23 Drawing Sheets

(56)  References Cited

U.S. PATENT DOCUMENTS

| | | | |
|---|---|---|---|
| 2021/0192043 A1 | 6/2021 | Bhary et al. | |
| 2021/0344693 A1 | 11/2021 | Azad et al. | |
| 2021/0377301 A1 | 12/2021 | Desai et al. | |
| 2021/0377303 A1 | 12/2021 | Bui et al. | |
| 2021/0377304 A1 | 12/2021 | Ma et al. | |
| 2022/0083659 A1 | 3/2022 | Ma et al. | |
| 2022/0083661 A1 | 3/2022 | Ma et al. | |
| 2022/0294829 A1* | 9/2022 | Crabtree | G06F 16/2477 |
| 2022/0353244 A1* | 11/2022 | Kahn | H04L 67/12 |
| 2023/0035522 A1* | 2/2023 | Nadgowda | G06F 21/577 |
| 2023/0164182 A1 | 5/2023 | Kothari et al. | |
| 2023/0164183 A1 | 5/2023 | Kothari et al. | |
| 2023/0164184 A1 | 5/2023 | Kothari et al. | |
| 2024/0129310 A1* | 4/2024 | Andrews | H04L 63/029 |

* cited by examiner

Comparing Zero Trust with a network firewall architecture

You can't do Zero Trust Security with Firewalls/VPN

NETWORK DOMAIN <u>644</u>

660 admin

DIRECTORY <u>658</u>

SERVER <u>656</u>

USER DEVICE <u>642</u>

CLIENT CONNECTOR <u>646</u>
(e.g., APP <u>350</u>)

ITDR SYSTEM <u>648</u>

Identity Attack Surface Visibility Component <u>650</u>

Identity Hygiene Management Component <u>652</u>

Identity Threat Detection Component <u>654</u>

640

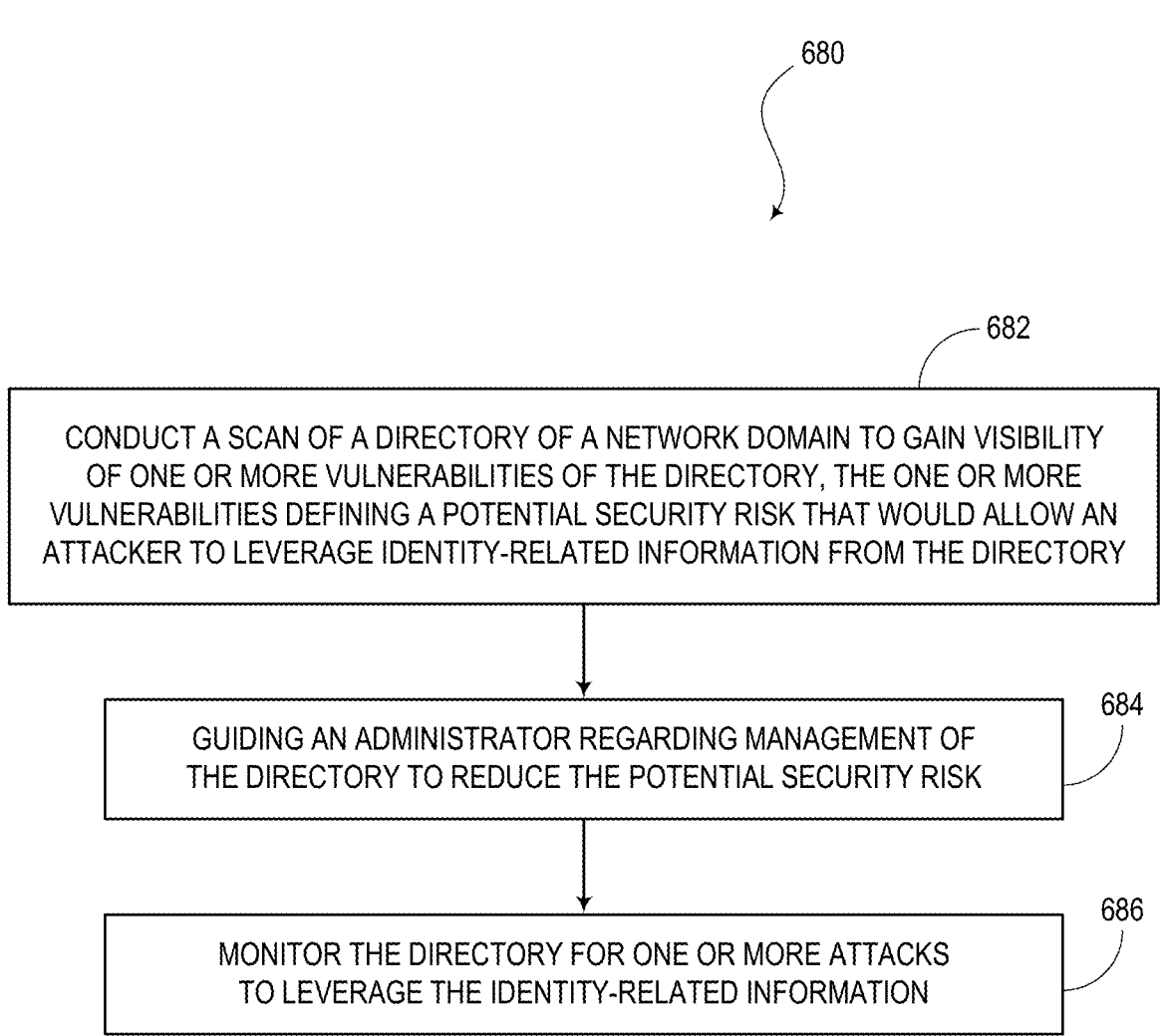

680

682

CONDUCT A SCAN OF A DIRECTORY OF A NETWORK DOMAIN TO GAIN VISIBILITY OF ONE OR MORE VULNERABILITIES OF THE DIRECTORY, THE ONE OR MORE VULNERABILITIES DEFINING A POTENTIAL SECURITY RISK THAT WOULD ALLOW AN ATTACKER TO LEVERAGE IDENTITY-RELATED INFORMATION FROM THE DIRECTORY

684

GUIDING AN ADMINISTRATOR REGARDING MANAGEMENT OF THE DIRECTORY TO REDUCE THE POTENTIAL SECURITY RISK

686

MONITOR THE DIRECTORY FOR ONE OR MORE ATTACKS TO LEVERAGE THE IDENTITY-RELATED INFORMATION

FIG. 17

IDENTITY THREAT DETECTION AND RESPONSE

CROSS-REFERENCE TO RELATED APPLICATION

The present application claims the benefit of priority to Provisional App. No. 63/508,063, filed Jun. 14, 2023, the contents of which are incorporated by reference herein.

FIELD OF THE DISCLOSURE

The present disclosure generally relates to computer networking systems and methods. More particularly, the present disclosure relates to systems and methods for Identity Threat Detection and Response (ITDR), executed both in the cloud and from end user device locations.

BACKGROUND OF THE DISCLOSURE

The traditional view of an enterprise network (i.e., corporate, private, industrial, operational, etc.) included a well-defined perimeter defended by various appliances (e.g., firewalls, intrusion prevention, advanced threat detection, etc.). In this traditional view, mobile users utilize a Virtual Private Network (VPN), etc. and have their traffic backhauled into the well-defined perimeter. This worked when mobile users represented a small fraction of the users, i.e., most users were within the well-defined perimeter. However, this is no longer the case—the definition of the workplace is no longer confined to within the well-defined perimeter, and with applications moving to the cloud, the perimeter has extended to the Internet. This results in an increased risk for the enterprise data residing on unsecured and unmanaged devices as well as the security risks in access to the Internet. Cloud-based security solutions have emerged, such as Zscaler Internet Access (ZIA) and Zscaler Private Access (ZPA), available from Zscaler, Inc., the applicant and assignee of the present application.

ZPA is a cloud service that provides seamless, zero trust access to private applications running on the public cloud, within the data center, within an enterprise network, etc. As described herein, ZPA is referred to as zero trust access to private applications or simply a zero trust access service. Here, applications are never exposed to the Internet, making them completely invisible to unauthorized users. The service enables the applications to connect to users via inside-out connectivity versus extending the network to them. Users are never placed on the network. This Zero Trust Network Access (ZTNA) approach supports both managed and unmanaged devices and any private application (not just web apps).

BRIEF SUMMARY OF THE DISCLOSURE

The present disclosure relates to systems and methods for Identity Threat Detection and Response (ITDR), which can be executed in the cloud and may be triggered from the position of an end user device. ITDR provides identity protection to detect and stop identity-based threats such as credential theft and privilege misuse, attacks on Active Directory, and risky entitlements that create attack paths. With cloud-based ITDR, customers gain complete visibility into identity-related vulnerabilities, can monitor their environment continuously to detect identity-based threats and enable efficient risk remediation.

According to one implementation, a method includes the step of conducting a scan of a directory of a network domain to gain visibility of one or more vulnerabilities of the directory. For example, the one or more vulnerabilities may define a potential security risk that would allow an attacker to leverage identity-related information from the directory. The method further includes the step of guiding an administrator regarding management of the directory to reduce the potential security risk. Also, the method includes the step of monitoring the directory for one or more attacks to leverage the identity-related information.

In some embodiments, the method may be incorporated in memory or other non-transitory computer-readable media and may include instructions for enabling a processing device to perform the steps for protecting identity information. The functionality of the method may be incorporated in a system or device, such as a user device or endpoint device configured to remotely access the directory via a Zero Trust Network Access (ZTNA) system. The memory is further configured to store a client connector application allowing the user device to communicate with a server that allows the administrator to enter configuration settings for the directory. The server may enable the administrator to select a domain directory on which the scan is conducted and to select a user system from which the scan is launched.

The method may also include displaying information on a user interface. The method may include displaying the one or more vulnerabilities on the user interface to represent a security posture of the directory. In some embodiments, the method may also include the step of displaying, on the user interface, one or more of a) a risk score related to the potential security risk, b) a list of the one or more vulnerabilities, c) a prioritized list of issues that need remediation, d) a list of the riskiest users using the network domain, e) a list of the riskiest computers in the network domain, and f) a mapping of identity issues in a MITRE ATT&CK kill chain. Also, the method may include the step of displaying, on the user interface, guidance information including one or more of a) an explanation of how an attacker can exploit the one or more vulnerabilities, b) an impact that the one or more vulnerabilities can have if exploited, c) a list of users that would be impacted if the one or more vulnerabilities were exploited, and d) a set of steps or a video tutorial for remediating the one or more vulnerabilities.

For an unresolved issue of the one or more vulnerabilities, the method may further include the step of placing the unresolved issue in a safelist and then specifically monitoring for exploitation of the unresolved issue. In response to detecting a change to configuration settings associated with the directory, the method may alert the administrator, in real time, if the change introduces additional vulnerabilities to the directory. In response to detecting one or more attacks to leverage the identity-related information from the directory, the method may display a list of one or more attackers attempting to exploit the one or more vulnerabilities.

The method may work with a Zero Trust Network Access (ZTNA) system to perform ongoing monitoring of attacks and to contain an attack by blocking an attacker from accessing the identity-related information from the directory. The step of conducting the scan may include the step of assessing a vulnerability posture of an attack surface of the directory. The step of guiding the administrator may include the step of configuring the directory to avoid new risks and setting alerts when risks are detected. The step of monitoring for one or more attacks may include performing high-fidelity detection of one or more of a DCSync attack, a DCShadow attack, and a Lightweight Directory Access Protocol (LDAP) enumeration attack.

The directory, for example, may be a database associated with an Active Directory (AD). The identity-related information, for example, may include one or more of an identity of a user, credentials of a user, privileges of a user, and access rights of a user. The one or more vulnerabilities, for example, may include one or more misconfigurations, configuration settings that expose weaknesses, potential risks, and possible areas of exploitation.

BRIEF DESCRIPTION OF THE DRAWINGS

The present disclosure is illustrated and described herein with reference to the various drawings, in which like reference numbers are used to denote like system components/method steps, as appropriate, and in which:

FIG. 4 is a block diagram of a user device, which may be used with the cloud-based system or the like.

FIG. 17 is a flowchart illustrating an embodiment of a method for protecting identity information.

DETAILED DESCRIPTION OF THE DISCLOSURE

Again, the present disclosure relates to systems and methods for Identity Threat Detection and Response (ITDR), which can be performed in the cloud as well as at an end user device. ITDR provides identity protection to detect and stop identity-based threats such as credential theft and privilege misuse, attacks on Active Directory, and risky entitlements that create attack paths. With cloud-based ITDR, customers gain complete visibility into identity-related vulnerabilities, can monitor their environment continuously to detect identity-based threats and enable efficient risk remediation.

Example Cloud-Based System Architecture

Figure 1A:
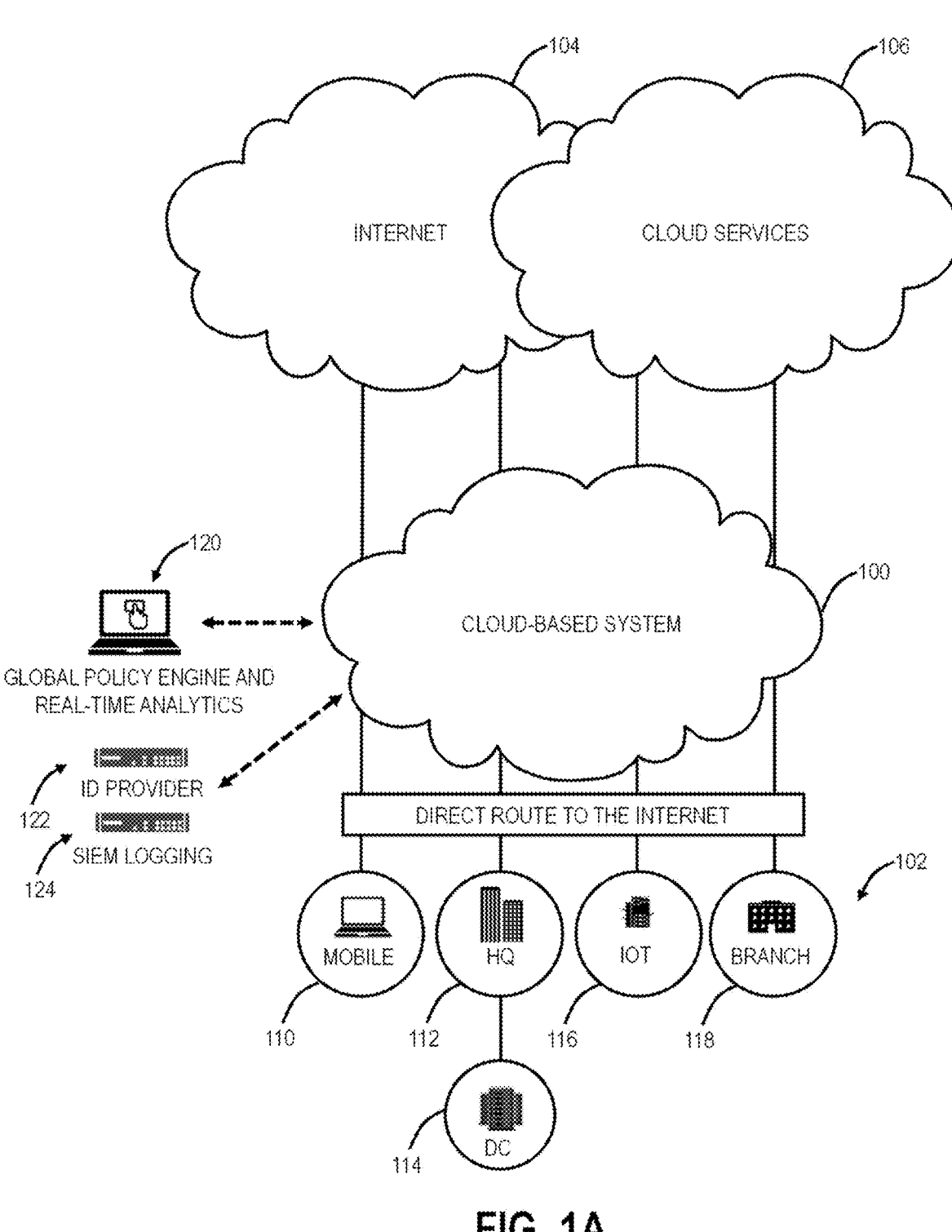
FIG. 1A is a network diagram of a cloud-based system offering security as a service.

FIG. 1A is a network diagram of a cloud-based system 100 offering security as a service. Specifically, the cloud-based system 100 can offer a Secure Internet and Web Gateway as a service to various users 102, as well as other cloud services. In this manner, the cloud-based system 100 is located between the users 102 and the Internet as well as any cloud services 106 (or applications) accessed by the users 102. As such, the cloud-based system 100 provides inline monitoring inspecting traffic between the users 102, the Internet 104, and the cloud services 106, including Secure Sockets Layer (SSL) traffic. The cloud-based system 100 can offer access control, threat prevention, data protection, etc. The access control can include a cloud-based firewall, cloud-based intrusion detection, Uniform Resource Locator (URL) filtering, bandwidth control, Domain Name System (DNS) filtering, etc. The threat prevention can include cloud-based intrusion prevention, protection against advanced threats (malware, spam, Cross-Site Scripting (XSS), phishing, etc.), cloud-based sandbox, antivirus, DNS security, etc. The data protection can include Data Loss Prevention (DLP), cloud application security such as via a Cloud Access Security Broker (CASB), file type control, etc.

The cloud-based firewall can provide Deep Packet Inspection (DPI) and access controls across various ports and protocols as well as being application and user aware. The URL filtering can block, allow, or limit website access based on policy for a user, group of users, or entire organization, including specific destinations or categories of URLs (e.g., gambling, social media, etc.). The bandwidth control can enforce bandwidth policies and prioritize critical applications such as relative to recreational traffic. DNS filtering can control and block DNS requests against known and malicious destinations.

The cloud-based intrusion prevention and advanced threat protection can deliver full threat protection against malicious content such as browser exploits, scripts, identified botnets and malware callbacks, etc. The cloud-based sandbox can block zero-day exploits (just identified) by analyzing unknown files for malicious behavior. Advantageously, the cloud-based system 100 is multi-tenant and can service a large volume of the users 102. As such, newly discovered threats can be promulgated throughout the cloud-based system 100 for all tenants practically instantaneously. The antivirus protection can include antivirus, antispyware, anti-malware, etc. protection for the users 102, using signatures sourced and constantly updated. The DNS security can identify and route command-and-control connections to threat detection engines for full content inspection.

The DLP can use standard and/or custom dictionaries to continuously monitor the users 102, including compressed and/or SSL-encrypted traffic. Again, being in a cloud implementation, the cloud-based system 100 can scale this monitoring with near-zero latency on the users 102. The cloud application security can include CASB functionality to discover and control user access to known and unknown cloud services 106. The file type controls enable true file type control by the user, location, destination, etc. to determine which files are allowed or not.

Figure 5:
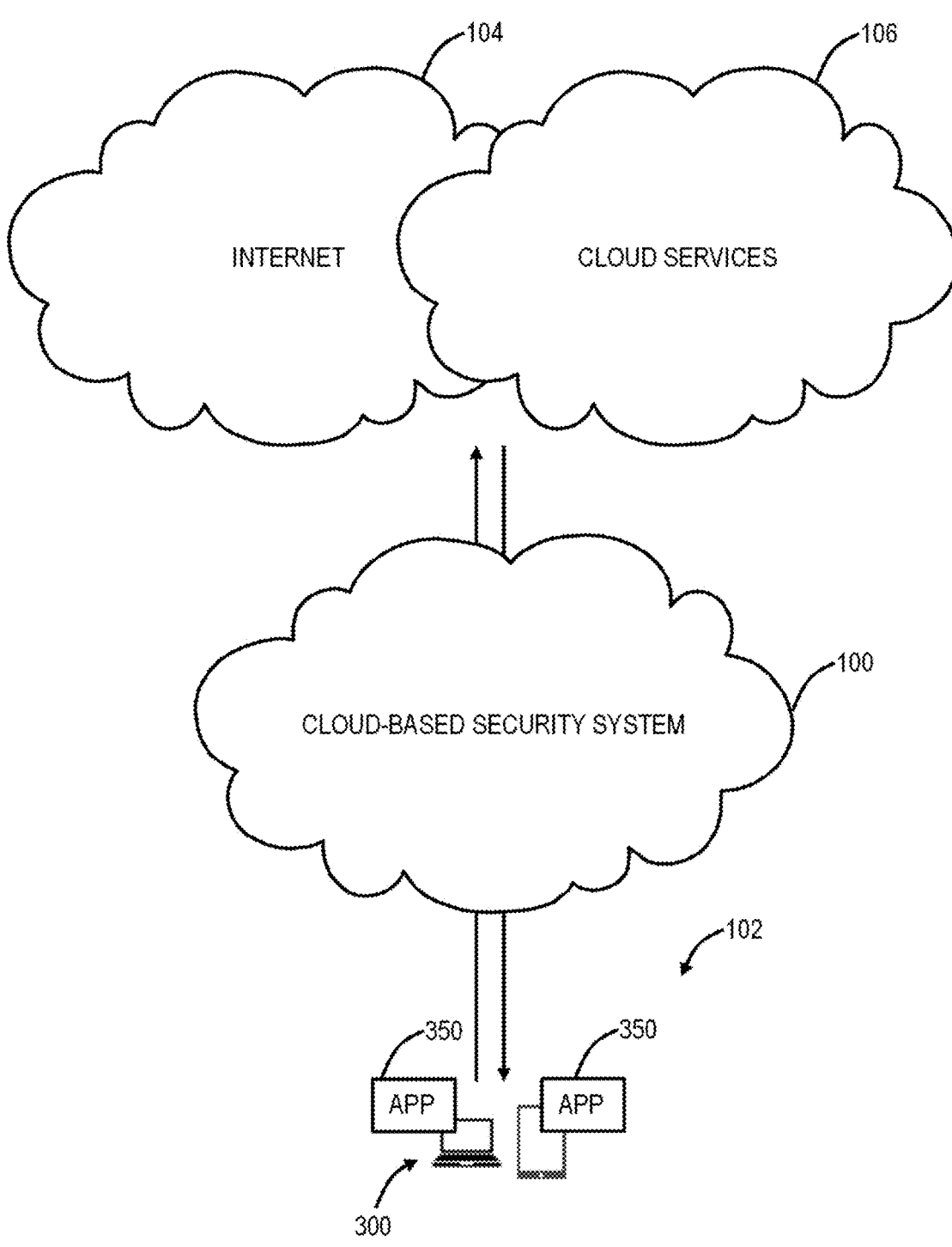
FIG. 5 is a network diagram of the cloud-based system illustrating an application on user devices with users configured to operate through the cloud-based system.

For illustration purposes, the users 102 of the cloud-based system 100 can include a mobile device 110, a headquarters (HQ) 112 which can include or connect to a data center (DC) 114, Internet of Things (IOT) devices 116, a branch office/remote location 118, etc., and each includes one or more user devices (an example user device 300 is illustrated in FIG. 5). The devices 110, 116, and the locations 112, 114, 118 are shown for illustrative purposes, and those skilled in the art will recognize there are various access scenarios and other users 102 for the cloud-based system 100, all of which are contemplated herein. The users 102 can be associated with a tenant, which may include an enterprise, a corporation, an organization, etc. That is, a tenant is a group of users who share a common access with specific privileges to the cloud-based system 100, a cloud service, etc. In an embodiment, the headquarters 112 can include an enterprise's network with resources in the data center 114. The mobile device 110 can be a so-called road warrior, i.e., users that are off-site, on-the-road, etc. Those skilled in the art will recognize a user 102 has to use a corresponding user device 300 for accessing the cloud-based system 100 and the like, and the description herein may use the user 102 and/or the user device 300 interchangeably.

Further, the cloud-based system 100 can be multi-tenant, with each tenant having its own users 102 and configuration, policy, rules, etc. One advantage of the multi-tenancy and a large volume of users is the zero-day/zero-hour protection in that a new vulnerability can be detected and then instantly remediated across the entire cloud-based system 100. The same applies to policy, rule, configuration, etc. changes—they are instantly remediated across the entire cloud-based system 100. As well, new features in the cloud-based system 100 can also be rolled up simultaneously across the user base, as opposed to selective and time-consuming upgrades on every device at the locations 112, 114, 118, and the devices 110, 116.

Logically, the cloud-based system 100 can be viewed as an overlay network between users (at the locations 112, 114, 118, and the devices 110, 116) and the Internet 104 and the cloud services 106. Previously, the IT deployment model included enterprise resources and applications stored within the data center 114 (i.e., physical devices) behind a firewall (perimeter), accessible by employees, partners, contractors, etc. on-site or remote via Virtual Private Networks (VPNs), etc. The cloud-based system 100 is replacing the conventional deployment model. The cloud-based system 100 can be used to implement these services in the cloud without requiring the physical devices and management thereof by enterprise IT administrators. As an ever-present overlay network, the cloud-based system 100 can provide the same functions as the physical devices and/or appliances regardless of geography or location of the users 102, as well as independent of platform, operating system, network access technique, network access provider, etc.

There are various techniques to forward traffic between the users 102 at the locations 112, 114, 118, and via the devices 110, 116, and the cloud-based system 100. Typically, the locations 112, 114, 118 can use tunneling where all traffic is forward through the cloud-based system 100. For example, various tunneling protocols are contemplated, such as Generic Routing Encapsulation (GRE), Layer Two Tunneling Protocol (L2TP), Internet Protocol (IP) Security (IPsec), customized tunneling protocols, etc. The devices 110, 116, when not at one of the locations 112, 114, 118 can use a local application that forwards traffic, a proxy such as via a Proxy Auto-Config (PAC) file, and the like. An application of the local application is the application 350 described in detail herein as a connector application. A key aspect of the cloud-based system 100 is all traffic between the users 102 and the Internet 104 or the cloud services 106 is via the cloud-based system 100. As such, the cloud-based system 100 has visibility to enable various functions, all of which are performed off the user device in the cloud.

The cloud-based system 100 can also include a management system 120 for tenant access to provide global policy and configuration as well as real-time analytics. This enables IT administrators to have a unified view of user activity, threat intelligence, application usage, etc. For example, IT administrators can drill-down to a per-user level to understand events and correlate threats, to identify compromised devices, to have application visibility, and the like. The cloud-based system 100 can further include connectivity to an Identity Provider (IDP) 122 for authentication of the users 102 and to a Security Information and Event Management (SIEM) system 124 for event logging. The system 124 can provide alert and activity logs on a per-user 102 basis.

Zero Trust

Figure 1B:
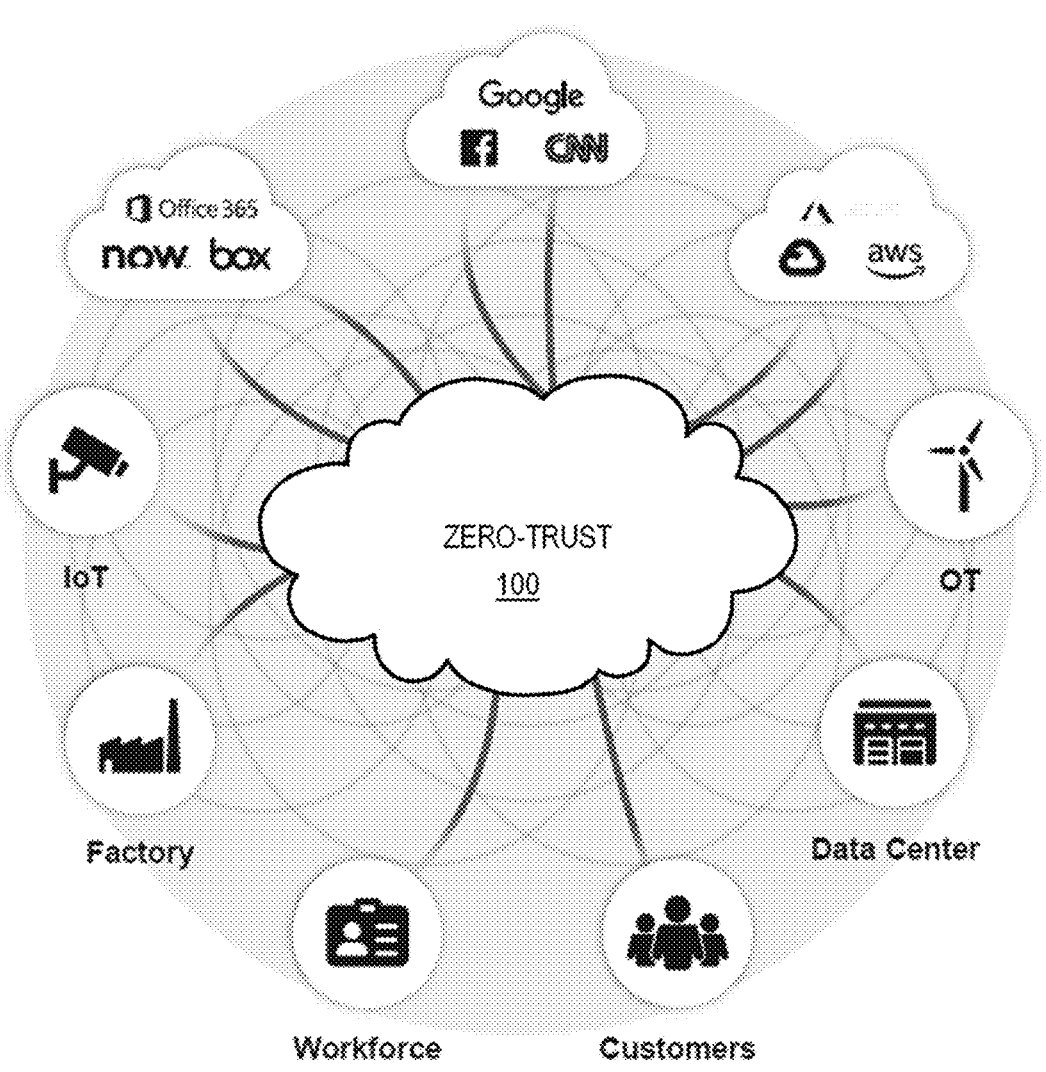
FIG. 1B is a logical diagram of the cloud-based system operating as a zero-trust platform.

FIG. 1B is a logical diagram of the cloud-based system 100 operating as a zero-trust platform. Zero trust is a framework for securing organizations in the cloud and mobile world that asserts that no user or application should be trusted by default. Following a key zero trust principle, least-privileged access, trust is established based on context (e.g., user identity and location, the security posture of the endpoint, the app or service being requested) with policy checks at each step, via the cloud-based system 100. Zero trust is a cybersecurity strategy wherein security policy is applied based on context established through least-privileged access controls and strict user authentication—not assumed trust. A well-tuned zero trust architecture leads to simpler network infrastructure, a better user experience, and improved cyberthreat defense.

Establishing a zero trust architecture requires visibility and control over the environment's users and traffic, including that which is encrypted; monitoring and verification of traffic between parts of the environment; and strong multi-factor authentication (MFA) methods beyond passwords, such as biometrics or one-time codes. This is performed via the cloud-based system 100. Critically, in a zero trust architecture, a resource's network location is not the biggest factor in its security posture anymore. Instead of rigid network segmentation, your data, workflows, services, and such are protected by software-defined microsegmentation, enabling you to keep them secure anywhere, whether in your data center or in distributed hybrid and multicloud environments.

The core concept of zero trust is simple: assume everything is hostile by default. It is a major departure from the network security model built on the centralized data center and secure network perimeter. These network architectures rely on approved IP addresses, ports, and protocols to establish access controls and validate what's trusted inside the network, generally including anybody connecting via remote access VPN. In contrast, a zero trust approach treats all traffic, even if it is already inside the perimeter, as hostile. For example, workloads are blocked from communicating until they are validated by a set of attributes, such as a fingerprint or identity. Identity-based validation policies result in stronger security that travels with the workload wherever it communicates—in a public cloud, a hybrid environment, a container, or an on-premises network architecture.

Because protection is environment-agnostic, zero trust secures applications and services even if they communicate across network environments, requiring no architectural changes or policy updates. Zero trust securely connects users, devices, and applications using business policies over any network, enabling safe digital transformation. Zero trust is about more than user identity, segmentation, and secure access. It is a strategy upon which to build a cybersecurity ecosystem.

At its core are three tenets:

Terminate every connection: Technologies like firewalls use a "passthrough" approach, inspecting files as they are delivered. If a malicious file is detected, alerts are often too late. An effective zero trust solution terminates every connection to allow an inline proxy architecture to inspect all traffic, including encrypted traffic, in real time—before it reaches its destination—to prevent ransomware, malware, and more.

Protect data using granular context-based policies: Zero trust policies verify access requests and rights based on context, including user identity, device, location, type of content, and the application being requested. Policies are adaptive, so user access privileges are continually reassessed as context changes.

Reduce risk by eliminating the attack surface: With a zero trust approach, users connect directly to the apps and resources they need, never to networks (see ZTNA). Direct user-to-app and app-to-app connections eliminate the risk of lateral movement and prevent compromised devices from infecting other resources. Plus, users and apps are invisible to the internet, so they cannot be discovered or attacked.

Figure 1C:
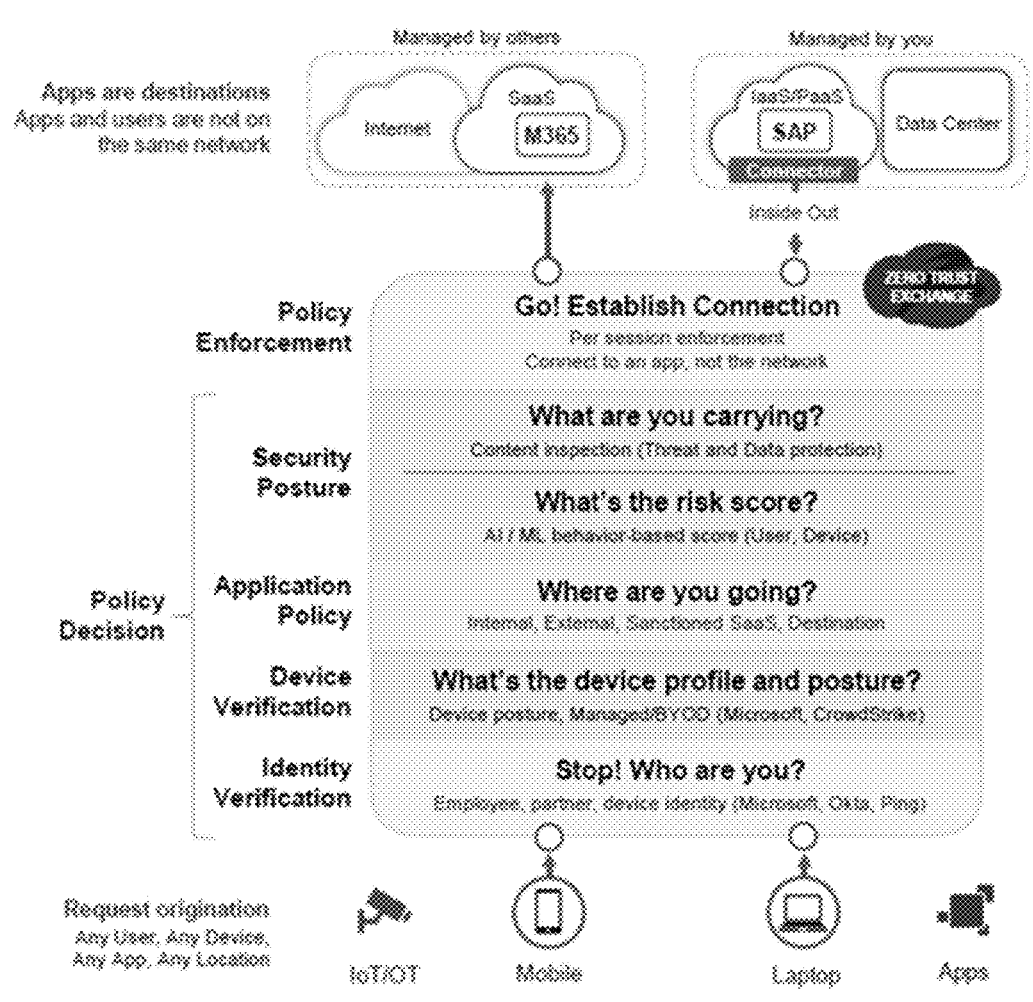
FIG. 1C is a logical diagram illustrating zero trust policies with the cloud-based system and a comparison with the conventional firewall-based approach.
Figure 1C:

FIG. 1C is a logical diagram illustrating zero trust policies with the cloud-based system 100 and a comparison with the conventional firewall-based approach. Zero trust with the cloud-based system 100 allows per session policy decisions and enforcement regardless of the user 102 location. Unlike the conventional firewall-based approach, this eliminates attack surfaces, there are no inbound connections; prevents lateral movement, the user is not on the network; prevents compromise, allowing encrypted inspection; and prevents data loss with inline inspection.

Example Implementation of the Cloud-Based System

Figure 2:
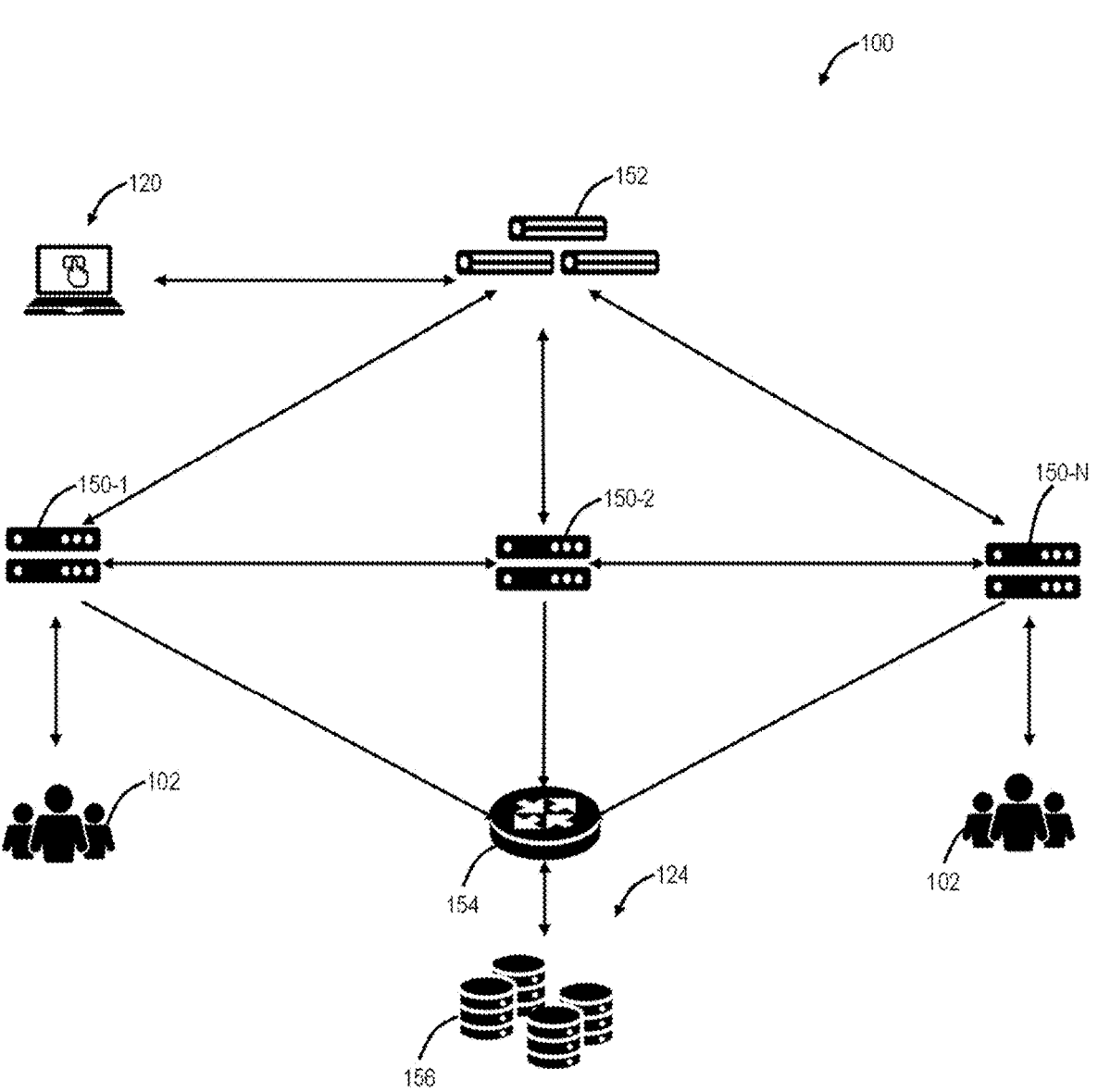
FIG. 2 is a network diagram of an example implementation of the cloud-based system.
Figure 4:
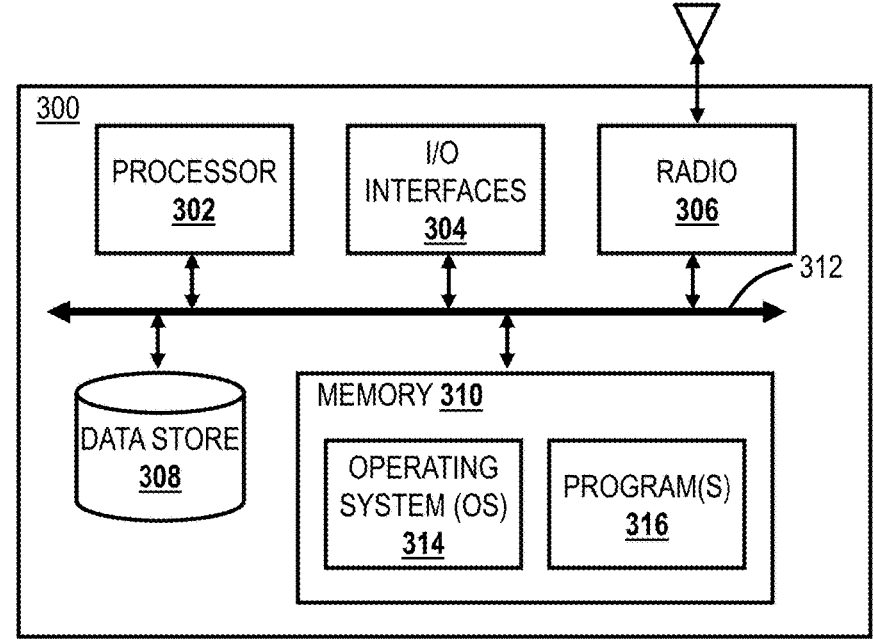

FIG. 2 is a network diagram of an example implementation of the cloud-based system 100. In an embodiment, the cloud-based system 100 includes a plurality of enforcement nodes (EN) 150, labeled as enforcement nodes 150-1, 150-2, 150-N, interconnected to one another and interconnected to a central authority (CA) 152. The nodes 150 and the central authority 152, while described as nodes, can include one or more servers, including physical servers, virtual machines (VM) executed on physical hardware, etc. An example of a server is illustrated in FIG. 4. The cloud-based system 100 further includes a log router 154 that connects to a storage cluster 156 for supporting log maintenance from the enforcement nodes 150. The central authority 152 provides centralized policy, real-time threat updates, etc. and coordinates the distribution of this data between the enforcement nodes 150. The enforcement nodes 150 provide an onramp to the users 102 and are configured to execute policy, based on the central authority 152, for each user 102. The enforcement nodes 150 can be geographically distributed, and the policy for each user 102 follows that user 102 as he or she connects to the nearest (or other criteria) enforcement node 150.

Of note, the cloud-based system 100 is an external system meaning it is separate from tenant's private networks (enterprise networks) as well as from networks associated with the devices 110, 116, and locations 112, 118. Also, of note, the present disclosure describes a private enforcement node 150P that is both part of the cloud-based system 100 and part of a private network. Further, of note, the enforcement node described herein may simply be referred to as a node or cloud node. Also, the terminology enforcement node 150 is used in the context of the cloud-based system 100 providing cloud-based security. In the context of secure, private application access, the enforcement node 150 can also be referred to as a service edge or service edge node. Also, a service edge node 150 can be a public service edge node (part of the cloud-based system 100) separate from an enterprise network or a private service edge node (still part of the cloud-based system 100) but hosted either within an enterprise network, in a data center 114, in a branch office 118, etc. Further, the term nodes as used herein with respect to the cloud-based system 100 (including enforcement nodes, service edge nodes, etc.) can be one or more servers, including physical servers, virtual machines (VM) executed on physical hardware, etc., as described above. The service edge node 150 can also be a Secure Access Service Edge (SASE).

The enforcement nodes 150 are full-featured secure internet gateways that provide integrated internet security. They inspect all web traffic bi-directionally for malware and enforce security, compliance, and firewall policies, as described herein, as well as various additional functionality. In an embodiment, each enforcement node 150 has two main modules for inspecting traffic and applying policies: a web module and a firewall module. The enforcement nodes 150 are deployed around the world and can handle hundreds of thousands of concurrent users with millions of concurrent sessions. Because of this, regardless of where the users 102 are, they can access the Internet 104 from any device, and the enforcement nodes 150 protect the traffic and apply corporate policies. The enforcement nodes 150 can implement various inspection engines therein, and optionally, send sandboxing to another system. The enforcement nodes 150 include significant fault tolerance capabilities, such as deployment in active-active mode to ensure availability and redundancy as well as continuous monitoring.

In an embodiment, customer traffic is not passed to any other component within the cloud-based system 100, and the enforcement nodes 150 can be configured never to store any data to disk. Packet data is held in memory for inspection and then, based on policy, is either forwarded or dropped. Log data generated for every transaction is compressed, tokenized, and exported over secure Transport Layer Security (TLS) connections to the log routers 154 that direct the logs to the storage cluster 156, hosted in the appropriate geographical region, for each organization. In an embodiment, all data destined for or received from the Internet is processed through one of the enforcement nodes 150. In another embodiment, specific data specified by each tenant, e.g., only email, only executable files, etc., is processed through one of the enforcement nodes 150.

Each of the enforcement nodes 150 may generate a decision vector $D=[d1, d2, \ldots, dn]$ for a content item of one or more parts $C=[c1, c2, \ldots, cm]$. Each decision vector may identify a threat classification, e.g., clean, spyware, malware, undesirable content, innocuous, spam email, unknown, etc. For example, the output of each element of the decision vector D may be based on the output of one or more data inspection engines. In an embodiment, the threat classification may be reduced to a subset of categories, e.g., violating, non-violating, neutral, unknown. Based on the subset classification, the enforcement node 150 may allow the distribution of the content item, preclude distribution of the content item, allow distribution of the content item after a cleaning process, or perform threat detection on the content item. In an embodiment, the actions taken by one of the enforcement nodes 150 may be determinative on the threat classification of the content item and on a security policy of the tenant to which the content item is being sent from or from which the content item is being requested by. A content item is violating if, for any part $C=[c1, c2, \ldots, cm]$ of the content item, at any of the enforcement nodes 150, any one of the data inspection engines generates an output that results in a classification of "violating."

The central authority 152 hosts all customer (tenant) policy and configuration settings. It monitors the cloud and provides a central location for software and database updates and threat intelligence. Given the multi-tenant architecture, the central authority 152 is redundant and backed up in multiple different data centers. The enforcement nodes 150 establish persistent connections to the central authority 152 to download all policy configurations. When a new user connects to an enforcement node 150, a policy request is sent to the central authority 152 through this connection. The central authority 152 then calculates the policies that apply to that user 102 and sends the policy to the enforcement node 150 as a highly compressed bitmap.

The policy can be tenant-specific and can include access privileges for users, websites and/or content that is disallowed, restricted domains, DLP dictionaries, etc. Once downloaded, a tenant's policy is cached until a policy change is made in the management system 120. The policy can be tenant-specific and can include access privileges for users, websites and/or content that is disallowed, restricted domains, DLP dictionaries, etc. When this happens, all of the cached policies are purged, and the enforcement nodes 150 request the new policy when the user 102 next makes a request. In an embodiment, the enforcement node 150 exchange "heartbeats" periodically, so all enforcement nodes 150 are informed when there is a policy change. Any enforcement node 150 can then pull the change in policy when it sees a new request.

The cloud-based system 100 can be a private cloud, a public cloud, a combination of a private cloud and a public cloud (hybrid cloud), or the like. Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "Software as a Service" (SaaS) is sometimes used to describe application programs offered through cloud computing. A common shorthand for a provided cloud computing service (or even an aggregation of all existing cloud services) is "the cloud." The cloud-based system 100 is illustrated herein as an example embodiment of a cloud-based system, and other implementations are also contemplated.

As described herein, the terms cloud services and cloud applications may be used interchangeably. The cloud service 106 is any service made available to users on-demand via the Internet, as opposed to being provided from a company's on-premises servers. A cloud application, or cloud app, is a software program where cloud-based and local components work together. The cloud-based system 100 can be utilized to provide example cloud services, including Zscaler Internet Access (ZIA), Zscaler Private Access (ZPA), Zscaler Posture Control (ZPC), and Zscaler Digital Experience (ZDX), all from Zscaler, Inc. (the assignee and applicant of the present application). Also, there can be multiple different cloud-based systems 100, including ones with different architectures and multiple cloud services. The ZIA service can provide the access control, threat prevention, and data protection described above with reference to the cloud-based system 100. ZPA can include access control, microservice segmentation, etc. The ZDX service can provide monitoring of user experience, e.g., Quality of Experience (QoE), Quality of Service (QOS), etc., in a manner that can gain insights based on continuous, inline monitoring. For example, the ZIA service can provide a user with Internet Access, and the ZPA service can provide a user with access to enterprise resources instead of traditional Virtual Private Networks (VPNs), namely ZPA provides Zero Trust Network Access (ZTNA). ZPC is a Cloud-Native Application Protection Platform (CNAPP) which is a new category of security products, encompassing the functionality previously found in Cloud Security Posture Management (CSPM) and Cloud Workload Protection Platform (CWPP) products and more. Those of ordinary skill in the art will recognize various other types of cloud services 106 are also contemplated. Also, other types of cloud architectures are also contemplated, with the cloud-based system 100 presented for illustration purposes.

Example Server Architecture

Figure 3:
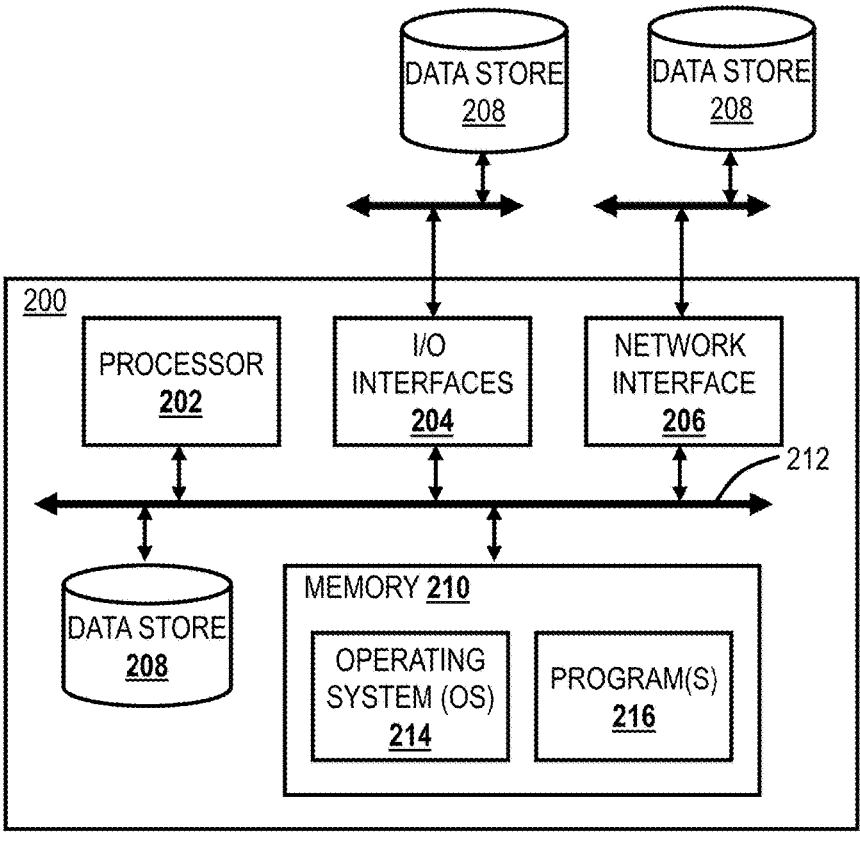
FIG. 3 is a block diagram of a server, which may be used in the cloud-based system, in other systems, or standalone.

FIG. 3 is a block diagram of a server 200, which may be used in the cloud-based system 100, in other systems, or standalone. For example, the enforcement nodes 150 and the central authority 152 may be formed as one or more of the servers 200. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 3 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a Central Processing Unit (CPU), an auxiliary processor among several processors associated with the server 200, a semiconductor-based microprocessor (in the form of a microchip or chipset), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components.

The network interface 206 may be used to enable the server 200 to communicate on a network, such as the Internet 104. The network interface 206 may include, for example, an Ethernet card or adapter or a Wireless Local Area Network (WLAN) card or adapter. The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof.

Moreover, the data store 208 may incorporate electronic, magnetic, optical, and/or other types of storage media. In one example, the data store 208 may be located internal to the server 200, such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable Operating System (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

Example User Device Architecture

FIG. 4 is a block diagram of a user device 300, which may be used with the cloud-based system 100 or the like.

Specifically, the user device 300 can form a device used by one of the users 102, and this may include common devices such as laptops, smartphones, tablets, netbooks, personal digital assistants, MP3 players, cell phones, e-book readers, IOT devices, servers, desktops, printers, televisions, streaming media devices, and the like. The user device 300 can be a digital device that, in terms of hardware architecture, generally includes a processor 302, I/O interfaces 304, a network interface 306, a radio 306, a data store 308, and memory 310. It should be appreciated by those of ordinary skill in the art that FIG. 4 depicts the user device 300 in an oversimplified manner, and a practical embodiment may include additional components and suitably configured processing logic to support known or conventional operating features that are not described in detail herein. The components (302, 304, 306, 308, and 310) are communicatively coupled via a local interface 312. The local interface 312 can be, for example, but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a CPU, an auxiliary processor among several processors associated with the user device 300, a semiconductor-based microprocessor (in the form of a microchip or chipset), or generally any device for executing software instructions. When the user device 300 is in operation, the processor 302 is configured to execute software stored within the memory 310, to communicate data to and from the memory 310, and to generally control operations of the user device 300 pursuant to the software instructions. In an embodiment, the processor 302 may include a mobile optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, a barcode scanner, and the like. System output can be provided via a display device such as a Liquid Crystal Display (LCD), touch screen, and the like.

The radio 306 enables wireless communication to an external access device or network. Any number of suitable wireless data communication protocols, techniques, or methodologies can be supported by the radio 306, including any protocols for wireless communication. The data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

The memory 310 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another but can be accessed by the processor 302. The software in memory 310 can include one or more software programs, each of which includes an ordered listing of executable instructions for implementing logical functions. In the example of FIG. 3, the software in the memory 310 includes a suitable operating system (O/S) 314 and programs 316. The operating system 314 essentially controls the execution of other computer programs and provides scheduling, input-output control, file and data management, memory management, and communication control and related services. The programs 316 may include various applications, add-ons, etc. configured to provide end user functionality with the user device 300. For example, example programs 316 may include, but not limited to, a web browser, social networking applications, streaming media applications, games, mapping and location applications, electronic mail applications, financial applications, and the like. In a typical example, the end-user typically uses one or more of the programs 316 along with a network such as the cloud-based system 100.

§ 2.0 User Device Application for Traffic Forwarding and Monitoring

FIG. 5 is a network diagram of the cloud-based system 100 illustrating an application 350 on user devices 300 with users 102 configured to operate through the cloud-based system 100. Different types of user devices 300 are proliferating, including Bring Your Own Device (BYOD) as well as IT-managed devices. The conventional approach for a user device 300 to operate with the cloud-based system 100 as well as for accessing enterprise resources includes complex policies, VPNs, poor user experience, etc. The application 350 can automatically forward user traffic with the cloud-based system 100 as well as ensuring that security and access policies are enforced, regardless of device, location, operating system, or application. The application 350 automatically determines if a user 102 is looking to access the open Internet 104, a SaaS app, or an internal app running in public, private, or the datacenter and routes mobile traffic through the cloud-based system 100. The application 350 can support various cloud services, including ZIA, ZPA, ZDX, etc., allowing the best in class security with zero trust access to internal apps. As described herein, the application 350 can also be referred to as a connector application.

The application 350 is configured to auto-route traffic for seamless user experience. This can be protocol as well as application-specific, and the application 350 can route traffic with a nearest or best fit enforcement node 150. Further, the application 350 can detect trusted networks, allowed applications, etc. and support secure network access. The application 350 can also support the enrollment of the user device 300 prior to accessing applications. The application 350 can uniquely detect the users 102 based on fingerprinting the user device 300, using criteria like device model, platform, operating system, etc. The application 350 can support Mobile Device Management (MDM) functions, allowing IT personnel to deploy and manage the user devices 300 seamlessly. This can also include the automatic installation of client and SSL certificates during enrollment. Finally, the application 350 provides visibility into device and app usage of the user 102 of the user device 300.

The application 350 supports a secure, lightweight tunnel between the user device 300 and the cloud-based system 100. For example, the lightweight tunnel can be HTTP-based. With the application 350, there is no requirement for PAC files, an IPsec VPN, authentication cookies, or user 102 setup.

§ 5.0 Zero Trust Network Access using the Cloud-Based System

Figures 6, 7:
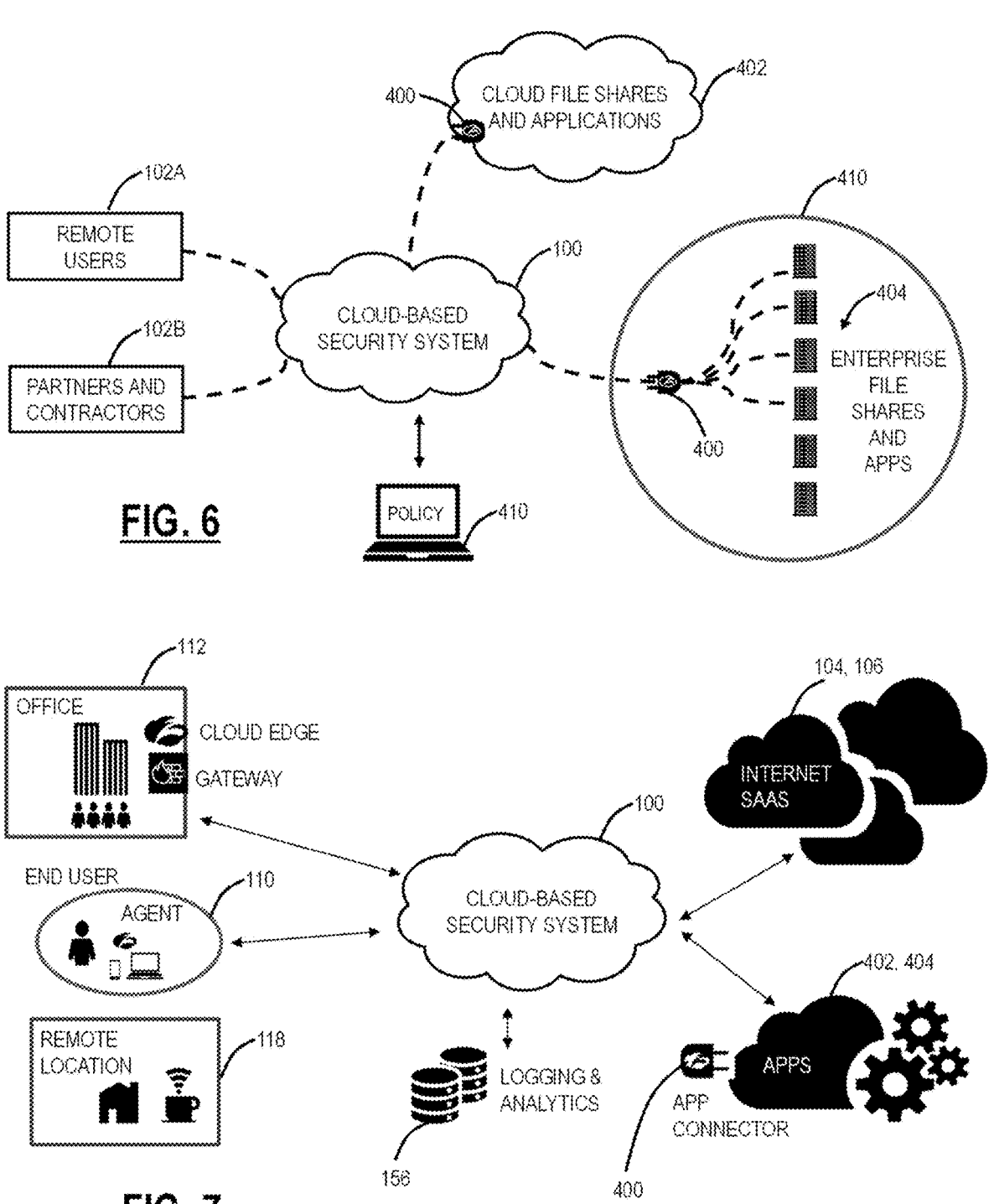
FIG. 6 is a network diagram of a Zero Trust Network Access (ZTNA) application utilizing the cloud-based system of FIGS. 1 and 2.
FIG. 7 is a network diagram of the cloud-based system of FIGS. 1 and 2 in an application of digital experience monitoring.

FIG. 6 is a network diagram of a Zero Trust Network Access (ZTNA) application utilizing the cloud-based system 100. For ZTNA, the cloud-based system 100 can dynamically create a connection through a secure tunnel between an endpoint (e.g., users 102A, 102B) that are remote and an on-premises connector 400 that is either located in cloud file shares and applications 402 and/or in an enterprise network 410 that includes enterprise file shares and applications 404. The connection between the cloud-based system 100 and on-premises connector 400 is dynamic, on-demand, and orchestrated by the cloud-based system 100. A key feature is its security at the edge—there is no need to punch any holes in the existing on-premises firewall. The connector 400 inside the enterprise (on-premises) "dials out" and connects to the cloud-based system 100 as if too were an endpoint. This on-demand dial-out capability and tunneling authenticated traffic back to the enterprise is a key differentiator for ZTNA. Also, this functionality can be implemented in part by the application 350 on the user device 300. Also, the applications 402, 404 can include B2B applications. Note, the difference between the applications 402, 404 is the applications 402 are hosted in the cloud, whereas the applications 404 are hosted on the enterprise network 410. The B2B service described herein contemplates use with either or both of the applications 402, 404.

The paradigm of virtual private access systems and methods is to give users network access to get to an application and/or file share, not to the entire network. If a user is not authorized to get the application, the user should not be able even to see that it exists, much less access it. The virtual private access systems and methods provide an approach to deliver secure access by decoupling applications 402, 404 from the network, instead of providing access with a connector 400, in front of the applications 402, 404, an application on the user device 300, a central authority 152 to push policy, and the cloud-based system 100 to stitch the applications 402, 404 and the software connectors 400 together, on a per-user, per-application basis.

With the virtual private access, users can only see the specific applications 402, 404 allowed by the central authority 152. Everything else is "invisible" or "dark" to them. Because the virtual private access separates the application from the network, the physical location of the application 402, 404 becomes irrelevant—if applications 402, 404 are located in more than one place, the user is automatically directed to the instance that will give them the best performance. The virtual private access also dramatically reduces configuration complexity, such as policies/firewalls in the data centers. Enterprises can, for example, move applications to Amazon Web Services or Microsoft Azure, and take advantage of the elasticity of the cloud, making private, internal applications behave just like the marketing leading enterprise applications. Advantageously, there is no hardware to buy or deploy because the virtual private access is a service offered to end-users and enterprises.

§ 6.0 Digital Experience Monitoring

FIG. 7 is a network diagram of the cloud-based system 100 in an application of digital experience monitoring. Here, the cloud-based system 100 providing security as a service as well as ZTNA, can also be used to provide real-time, continuous digital experience monitoring, as opposed to conventional approaches (synthetic probes). A key aspect of the architecture of the cloud-based system 100 is the inline monitoring. This means data is accessible in real-time for individual users from end-to-end. As described herein, digital experience monitoring can include monitoring, analyzing, and improving the digital user experience.

The cloud-based system 100 connects users 102 at the locations 110, 112, 118 to the applications 402, 404, the Internet 104, the cloud services 106, etc. The inline, end-to-end visibility of all users enables digital experience monitoring. The cloud-based system 100 can monitor, diagnose, generate alerts, and perform remedial actions with respect to network endpoints, network components, network links, etc. The network endpoints can include servers, virtual machines, containers, storage systems, or anything with an IP address, including the Internet of Things (IoT), cloud, and wireless endpoints. With these components, these network endpoints can be monitored directly in combination with a network perspective. Thus, the cloud-based system 100 provides a unique architecture that can enable digital experience monitoring, network application monitoring, infrastructure component interactions, etc. Of note, these various monitoring aspects require no additional components—the cloud-based system 100 leverages the existing infrastructure to provide this service.

Again, digital experience monitoring includes the capture of data about how end-to-end application availability, latency, and quality appear to the end user from a network perspective. This is limited to the network traffic visibility and not within components, such as what application performance monitoring can accomplish. Networked application monitoring provides the speed and overall quality of networked application delivery to the user in support of key business activities. Infrastructure component interactions include a focus on infrastructure components as they interact via the network, as well as the network delivery of services or applications. This includes the ability to provide network path analytics.

The cloud-based system 100 can enable real-time performance and behaviors for troubleshooting in the current state of the environment, historical performance and behaviors to understand what occurred or what is trending over time, predictive behaviors by leveraging analytics technologies to distill and create actionable items from the large dataset collected across the various data sources, and the like. The cloud-based system 100 includes the ability to directly ingest any of the following data sources network device-generated health data, network device-generated traffic data, including flow-based data sources inclusive of NetFlow and IPFIX, raw network packet analysis to identify application types and performance characteristics, HTTP request metrics, etc. The cloud-based system 100 can operate at 10 gigabits (10 G) Ethernet and higher at full line rate and support a rate of 100,000 or more flows per second or higher.

The applications 402, 404 can include enterprise applications, Office 365, Salesforce, Skype, Google apps, internal applications, etc. These are critical business applications where user experience is important. The objective here is to collect various data points so that user experience can be quantified for a particular user, at a particular time, for purposes of analyzing the experience as well as improving the experience. In an embodiment, the monitored data can be from different categories, including application-related, network-related, device-related (also can be referred to as endpoint-related), protocol-related, etc. Data can be collected at the application 350 or the cloud edge to quantify user experience for specific applications, i.e., the application-related and device-related data. The cloud-based system 100 can further collect the network-related and the protocol-related data (e.g., Domain Name System (DNS) response time).

Application-Related Data

| | |
|---|---|
| Page Load Time | Redirect count (#) |
| Page Response Time | Throughput (bps) |
| Document Object Model (DOM) Load Time | Total size (bytes) |
| Total Downloaded bytes | Page error count (#) |
| App availability (%) | Page element count by category (#) |

Network-Related Data

| | |
|---|---|
| HTTP Request metrics | Bandwidth |
| Server response time | Jitter |
| Ping packet loss (%) | Trace Route |
| Ping round trip | DNS lookup trace |
| Packet loss (%) | GRE/IPSec tunnel monitoring |
| Latency | MTU and bandwidth measurements |

Device-Related Data (Endpoint-Related Data)

| | |
|---|---|
| System details | Network (config) |
| Central Processing Unit (CPU) | Disk |
| Memory (RAM) | Processes |
| Network (interfaces) | Applications |

Metrics could be combined. For example, device health can be based on a combination of CPU, memory, etc. Network health could be a combination of Wi-Fi/LAN connection health, latency, etc. Application health could be a combination of response time, page loads, etc. The cloud-based system 100 can generate service health as a combination of CPU, memory, and the load time of the service while processing a user's request. The network health could be based on the number of network path(s), latency, packet loss, etc.

The lightweight connector 400 can also generate similar metrics for the applications 402, 404. In an embodiment, the metrics can be collected while a user is accessing specific applications that user experience is desired for monitoring. In another embodiment, the metrics can be enriched by triggering synthetic measurements in the context of an inline transaction by the application 350 or cloud edge. The metrics can be tagged with metadata (user, time, app, etc.) and sent to a logging and analytics service for aggregation, analysis, and reporting. Further, network administrators can get UEX reports from the cloud-based system 100. Due to the inline nature and the fact the cloud-based system 100 is an overlay (in-between users and services/applications), the cloud-based system 100 enables the ability to capture user experience metric data continuously and to log such data historically. As such, a network administrator can have a long-term detailed view of the network and associated user experience.

§ 7.0 Cloud Tunnel

Figure 8:
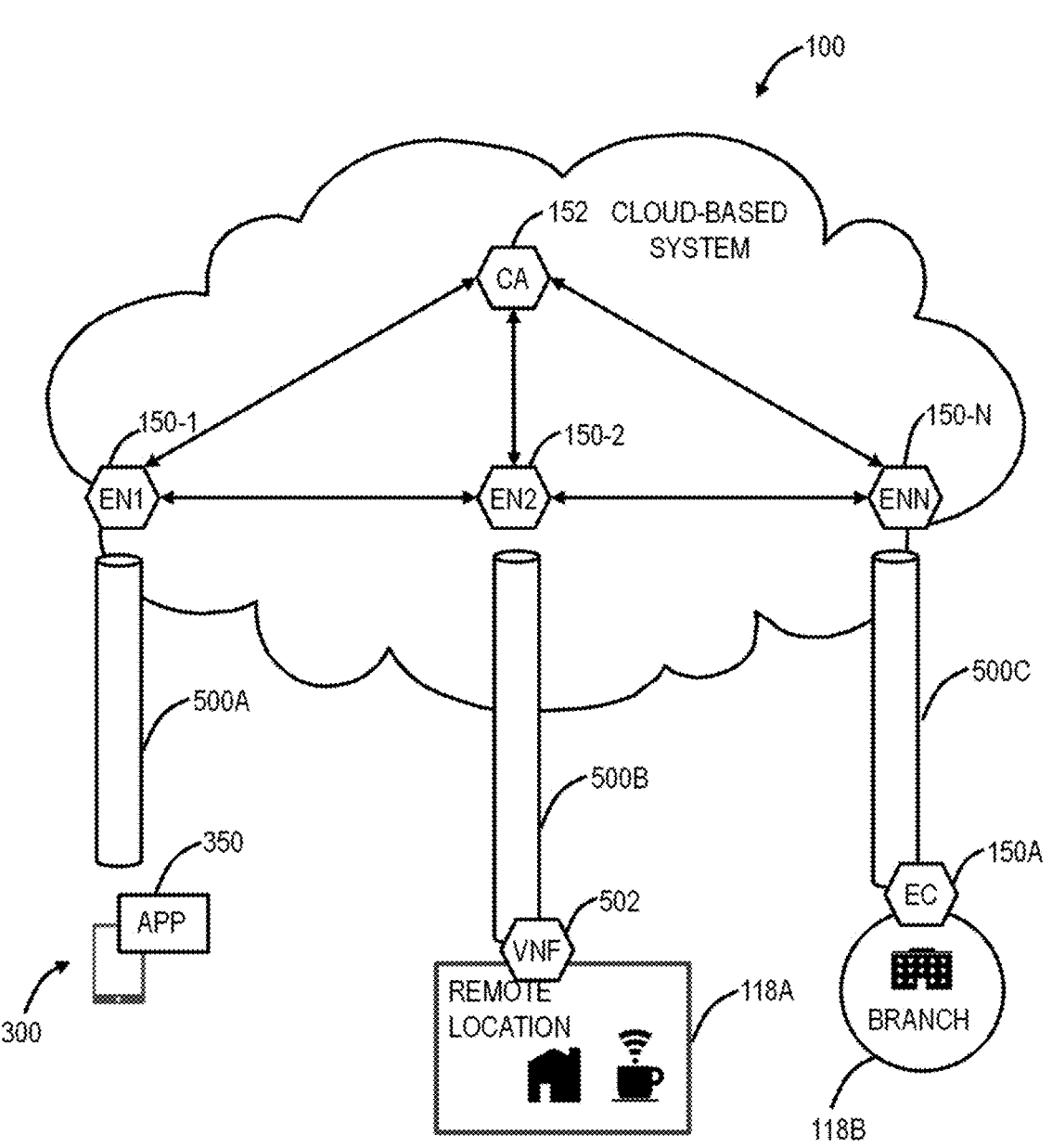
FIG. 8 is a network diagram of the cloud-based system of FIGS. 1 and 2 with various cloud tunnels, labeled as cloud tunnels, for forwarding traffic.

FIG. 8 is a network diagram of the cloud-based system 100 with various cloud tunnels 500, labeled as cloud tunnels 500A, 500B, 500C, for forwarding traffic. The cloud tunnel 500 is a lightweight tunnel that is configured to forward traffic between the client 510 and the server 520. The present disclosure focuses on the specific mechanisms used in the cloud tunnel 500 between two points, namely the client 510 and the server 520. Those skilled in the art will recognize the cloud tunnel 500 can be used with the cloud-based system 100 as an example use case, and other uses are contemplated. That is, the client 510 and the server 520 are just endpoint devices that support the exchange of data traffic and control traffic for the tunnel 500. For description, the server 520 can be referred to as a local node and the client 510 as a remote node, where the tunnel operates between the local and remote nodes.

In an embodiment, the cloud-based system 100 can use the cloud tunnel 500 to forward traffic to the enforcement nodes 150, such as from a user device 300 with the application 350, from a branch office/remote location 118, etc. FIG. 8 illustrates three example use cases for the cloud tunnel 500 with the cloud-based system 100, and other uses are also contemplated. In a first use case, a cloud tunnel 500A is formed between a user device 300, such as with the application 350, and an enforcement node 150-1. For example, when a user 102 associated with the user device 300 connects to a network, the application 350 can establish the cloud tunnel 500A to the closest or best enforcement node 150-1, and forward the traffic through the cloud tunnel 500A so that the enforcement node 150-1 can apply the appropriate security and access policies. Here, the cloud tunnel 500A supports a single user 102, associated with the user device 300.

In a second use case, a cloud tunnel 500B is formed between a Virtual Network Function (VNF) 502 or some other device at a remote location 118A and an enforcement node 150-2. Here, the VNF 502 is used to forward traffic from any user 102 at the remote location 118A to the enforcement node 150-2. In a third use case, a cloud tunnel 110C is formed between an on-premises enforcement node, referred to as an Edge Connector (EC) 150A, and an enforcement node 150-N. The edge connector 150A can be located at a branch office 118A or the like. In some embodiments, the edge connector 150A can be an enforcement node 150 in the cloud-based system 100 but located on-premises with a tenant. Here, in the second and third use cases, the cloud tunnels 500B, 500C support multiple users 102.

There can be two versions of the cloud tunnel 500, referred to a tunnel 1 and tunnel 2. The tunnel 1 can only support Web protocols as an HTTP connect tunnel operating on a TCP streams. That is, the tunnel 1 can send all proxy-aware traffic or port 80/443 traffic to the enforcement node 150, depending on the forwarding profile configuration. This can be performed via CONNECT requests, similar to a traditional proxy.

The tunnel 2 can support multiple ports and protocols, extending beyond only web protocols. As described herein, the cloud tunnels 500 are the tunnel 2. In all of the use cases, the cloud tunnel 500 enables each user device 300 to redirect traffic destined to all ports and protocols to a corresponding enforcement node 150. Note, the cloud-based system 100 can include load balancing functionality to spread the cloud tunnels 500 from a single source IP address. The cloud tunnel 500 supports device logging for all traffic, firewall, etc., such as in the storage cluster 156. The cloud tunnel 500 utilizes encryption, such as via TLS or DTLS, to tunnel packets between the two points, namely the client 510 and the server 520. As described herein, the client 510 can be the user device 300, the VNF 502, and/or the edge connector 150A, and the server 520 can be the enforcement node 150. Again, other devices are contemplated with the cloud tunnel 500.

The cloud tunnel 500 can use a Network Address Translation (NAT) device that does not require a different egress IP for each device's 300 separate sessions. Again, the cloud tunnel 500 has a tunneling architecture that uses DTLS or TLS to send packets to the cloud-based system 100. Because of this, the cloud tunnel 500 is capable of sending traffic from all ports and protocols.

Thus, the cloud tunnel 500 provides complete protection for a single user 102, via the application 350, as well as for multiple users at remote locations 118, including multiple security functions such as cloud firewall, cloud IPS, etc. The cloud tunnel 500 includes user-level granularity of the traffic, enabling different users 102 on the same cloud tunnel 500 for the enforcement nodes 150 to provide user-based granular policy and visibility. In addition to user-level granularity, the cloud tunnel 500 can provide application-level granularity, such as by mapping mobile applications (e.g., Facebook, Gmail, etc.) to traffic, allowing for app-based granular policies.

§ 8.0 Cloud-Based ITDR

Figure 9:
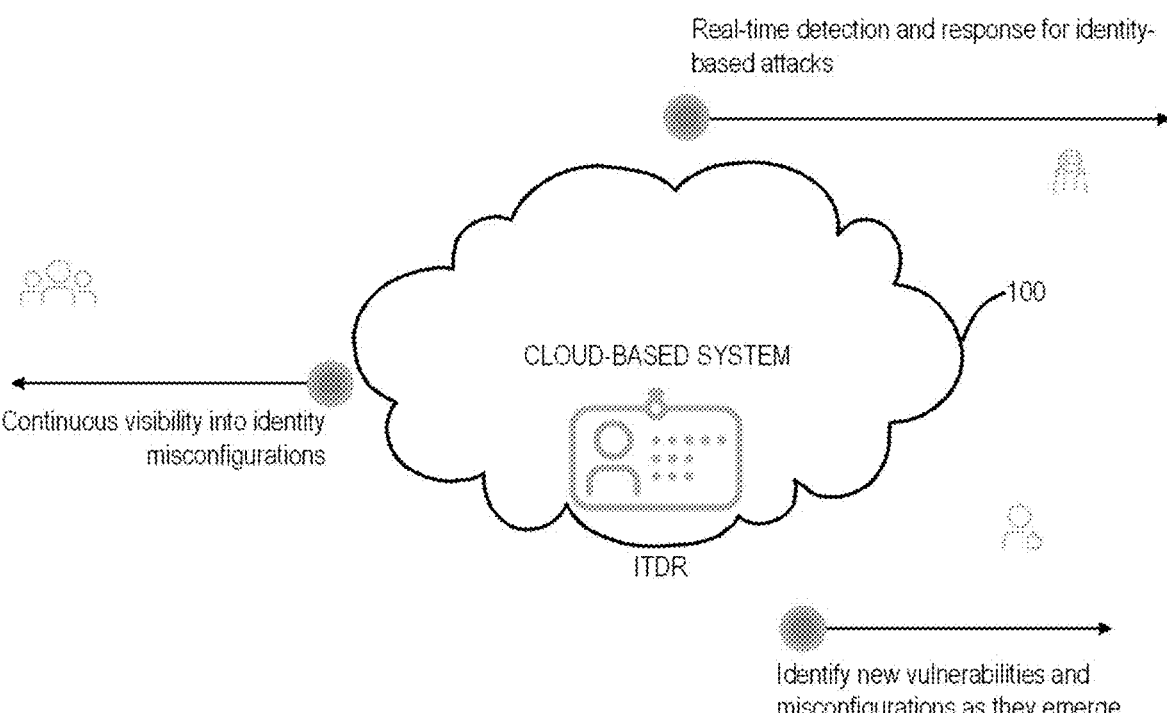
FIG. 9 is a network diagram of the cloud-based system of FIGS. 1 and 2 illustrating Identity Threat Detection and Response (ITDR) functionality therewith.

FIG. 9 is a network diagram of the cloud-based system 100 of FIGS. 1 and 2 illustrating ITDR functionality therewith. With "identity" becoming the next frontier of cyber-attacks, the cloud-based system 100 can be used for identity posture, hygiene management, and threat detection capabilities as the pillars of an identity-first approach to security that extends the tenets of Zero Trust to help create resilient IT environments.

§ 9.0 Cyber Defense in an Identity-Centric World

The end goal of all adversarial actions (e.g., attacks) is to leverage network resources to get to the crown jewels (i.e., identity-related information). There are a variety of resources that could aid threat actors (e.g., attackers), but the one that appears to have the highest effort-to-impact ratio is the "identity" of a user. Identity-based information, by extension, may also include the credentials, privileges, and access rights associated with this identity.

There are two paradigm shifts happening right now. First, Endpoint Detection and Response (EDR) solutions are approaching the tail end of the slope of enlightenment in Gartner's security operations hype cycle, meaning that these solutions are now pervasive and widely used. As a result, organizations are much more successful in detecting malicious tools and code execution than ever.

The second paradigm shift is the transition to Zero Trust systems, such as Zero Trust Network Access (ZTNA). Gartner projects that, by 2025, at least 70% of new remote access deployments will be served mainly by ZTNA instead of VPN services, up from less than 10% at the end of 2021. As evidence of this, more organizations continue to adopt a Zero Trust architecture, which is able to minimize their external attack surface, limit resource access, and verify every user and device.

Since these two paradigm shifts have forced the hand of threat actors, attackers are now going after identity-related information. If the modus operandi of a threat operation is to get to the crown jewels (e.g., identity data), then what better way to do it than by assuming the identity of a legitimate user? By compromising users and leveraging valid credentials, attackers can circumvent traditional detection controls and Zero Trust policies and instead leverage access rights and privileges to move laterally.

In terms of the effort-to-impact ratio of an attack operation, network, and host artifacts (e.g., which may include identity provider configurations, role-based access controls, and Windows credential stores, etc.) sit in the middle of the so-called "Pyramid of Pain," which is organized in layers (from the bottom of the pyramid to the top) to define how "painful" (i.e., troublesome) it would be for attackers if their victims discovered them and took actions against them. The middle layer of this pyramid, in this case, might be annoying for an attacker, but not overly challenging or difficult to overcome. As a result, identity-based attacks that use valid credentials have quickly become the preferred strategy of not just the most notorious organized threat actors (e.g., Evil Corp, Lapsus$, Nobelium, BlackMatter, Vice Society, etc.), but have also been widely embraced by the cyber-criminal community in general. For example, studies show that 1) about 80% of attacks in 2022 were identity-centric, 2) about half of all organizations suffered from Active Directory attacks, and 3) about 90% of Mandiant IR engagements involved the use of Active Directory. Thus, to the detriment of many organizations, notorious attackers have successfully executed breaches by compromising identity and identity stores like Active Directory.

Identity stores, identity databases, and identity directories (e.g., Active Directory) have become extremely complex over time. A lack of visibility of these directories, combined with "misconfigurations" (or network configurations that expose identity information) and excessive access permissions give threat actors access to all sorts of attack paths to escalate privileges and move laterally. This can be done by bypassing endpoint-based security tools and conventional identity and access management controls. It has been studied that, in some situations, a corporation can reduce their internal attack surface by using segmentation and adaptive risk-based access. Now, as described in the following section, the present disclosure provides solutions for how a corporation can further strengthen their Zero Trust posture by using innovations in "identity-first" security.

§ 9.1 Current Approaches are Ineffective

Organizations typically use traditional threat detection and identity management approaches to mitigate the risk of identity attacks. However, these approaches often fall short. For example, EDR is good for detecting the use of unauthorized tools/protocols/commands along with known/unknown exploits. However, EDRs fail when a user has been compromised, because legitimate and adversarial behavior starts to blend in. Another example of traditional identity management includes User and Entity Behavior Analytics (UEBA). In theory, baselining "normal" behavior and activities to detect anything that deviates from it is a sound approach, but in practice is prone to false positives. The lack of identity-centric threat telemetry makes UEBA ineffective against identity threats.

Identity and Access Management (IAM) and Privileged Access Management (PAM) (a subset of IAM) are solutions that provide some degree of preventive controls. However, fundamental issues in configuration and granting of access rights eventually extend to IAM and PAM implementations as well. For example, a local admin might create a second local admin account as a backup, resulting in the creation of an unmanaged admin. Furthermore, PAM controls (e.g., Multi-Factor Authentication (MFA), etc.) can be vulnerable to certain attacks (e.g., social engineering attacks, Man-in-the-Middle (MiTM) attacks, prompt bombing attacks, PTC attacks, info stealers, attacks based on purchasing credentials and authenticated-session cookies from IABs on the dark web, and others).

The above-noted paradigm shifts combined with the limited efficacy of existing solutions therefore necessitate an identity-centric approach to security.

§ 9.2 Anatomy of an Identity Attack

Figure 10:
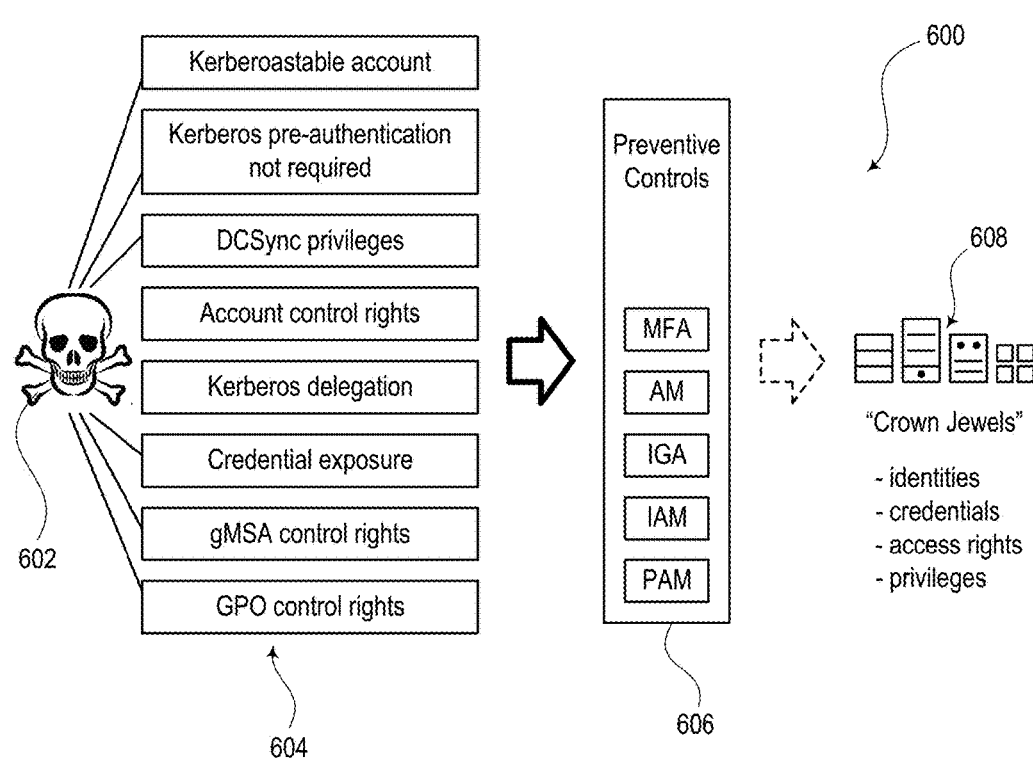
FIG. 10 is a diagram illustrating an example of the anatomy of a potential identity attack.

FIG. 10 is a diagram illustrating an example of the anatomy 600 of a potential identity attack. As shown, attackers 602 may launch attacks to exploit a number of vulnerabilities 604 or weaknesses in a security system. These vulnerabilities 604, for example, may include a Kerberoastable account, a situation where Kerberos pre-authentication is not required, DCSync privileges, account control rights, Kerberos delegation, credential exposure, gMSA control rights, GPO control rights, etc.

In defense against attacks, a network may be set up with preventive controls 606, which may include functionality for preventing identity theft and for preventing breaches with respect to access management. These preventive controls 606, for example, may include Multi-Factor Authentication (MFA), Access Management (AM), Identity Governance and Administration (IGA), IAM, PAM, etc. However, because of one or more of the vulnerabilities 604, the preventive controls 606 may be insufficient to prevent all attacks or breaches with respect to identity information and access management. Thus, as a result of breaches, the attacks may be able to access identity stores 608 to get to the "crown jewels" in the fight for identity protection. The crown jewels, for instance, may include identities or identification information, credentials, access rights, privileges, etc., which collectively may be referred to as "identity-related information."

To understand how each of the preventive controls 606 is capable of helping security teams mitigate the risk of identity threats, consider how attackers 602 exploit identity misconfigurations and permissions during the lateral propagation stage of the kill chain. Across the vast majority of organizations, users are managed in the Active Directory, the world's most widely used identity store. Security teams may use a combination of several identity and access management tools (e.g., the identity preventive controls 606). Unfortunately, these preventive controls 606 do not compensate for misconfigurations, access permissions, and other weaknesses or vulnerabilities in the identity store 608 itself. As a result, the attackers 602 or threat actors that compromise an identity have a variety of options at their disposal that can help them circumvent these preventive controls 606, intended to protect identity and access management, to get to the crown jewels.

§ 9.3 Identity-First Solutions

The present disclosure therefore introduces systems and methods configured to overcome the issues with traditional approaches. The solution described in the present disclosure may be referred to as Identity Threat Detection and Response (ITDR). According to various embodiments described herein, ITDR may include three pillars of security. The first pillar may be referred to as Identity Attack Surface Visibility. The second pillar may be referred to as Identity Hygiene Management. And the third pillar may be referred to as Identity Threat Detection. The three pillars of the identity-first approach may be configured to provide a new set of capabilities, including identity posture, hygiene management, and threat detection. These pillars of security can be incorporated and work alongside the tenets of Zero Trust to help create resilient IT environments.

Figure 11:
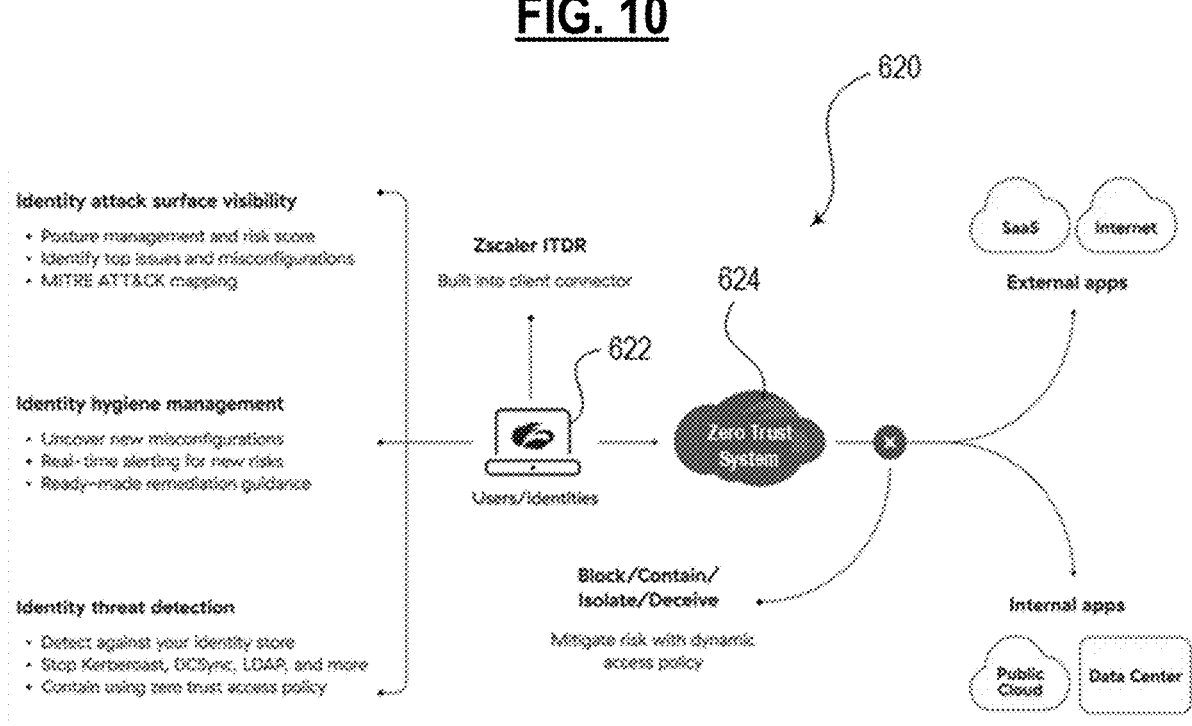
FIG. 11 is a diagram illustrating an embodiment of an ITDR system.

FIG. 11 is a diagram illustrating an embodiment of an ITDR system 620. As shown, the ITDR system 620 includes at least a user device 622 (e.g., user device 300) and a Zero Trust system 624. It should be noted that the ITDR system 620 may include a plurality of other user devices in addition to the user device 622 shown in FIG. 11. The Zero Trust system 624, for example, may include the Zero Trust architecture described with respect to FIG. 1B and utilize the Zero Trust Network Access (ZTNA) application described with respect to FIG. 6. Furthermore, the ITDR system 620, as shown, includes external apps (e.g., SaaS, the Internet, etc.) and internal apps (e.g., public cloud, data centers, etc.). The user device 622, equipped with ITDR functionality, is configured to operate in cooperation with the Zero Trust system 624 to perform the identity-first functionality, as described in the present disclosure, to protect identity-based information.

Figure 12:
FIG. 12 is a diagram illustrating an embodiment of an identity protection system, which may be part of the ITDR system of FIG. 11.

FIG. 12 is a diagram illustrating an embodiment of an identity protection system 640, which may be part of the ITDR system 620 of FIG. 11. In particular, the identity protection system 640 includes a user device 642 (e.g., user device 300, 622) and a network domain 644, which may be associated with a specific corporation that is benefiting from identity protection services. The user device 642 may include a client connector 646 (e.g., application 350), which may be configured to control connections and access privileges between users and resources in the network domain 644. In addition, the user device 642 may include an ITDR module 648, which may be implemented in any suitable combination of hardware and software.

The ITDR module 648, for example, may be incorporated in the client connector 646 in some embodiments. It should be noted that some functionality of the ITDR module 648 may be shared with the Zero Trust system 624 or other cloud-based server. The ITDR module 648 may include an identity attack-surface visibility component 650, an identity hygiene management component 652, and an identity threat detection component 654. The network domain 644 may include a server 656 (e.g., server 200) and a directory 658 (e.g., identity store, Active Directory, database, etc.). The server 656 may be operated by an administrator (or admin) 660 and may be configured to control access to the directory 658.

The ITDR systems and methods described herein take a low-touch and operationally simple approach to identity security. In some embodiments, at least parts of the ITDR functionality may be built into the client connector 646 of the user device 642. According to some embodiments, the user device 642 may be a unified agent that securely brokers connections between users and applications/resources.

§ 9.4 General Identity Attack-Surface Visibility Methodologies

Generally, the identity attack-surface visibility component 650, along with cooperating applications in the Zero Trust system 624, is configured to gain an understanding of certain vulnerabilities that may allow an attacker to exploit identity information. The first step towards securing identities is to thoroughly audit the identity infrastructure. Through the identity attack-surface visibility component 650, the ITDR module 648 is configured to provide the ability to assess the on-premises directory 658 (e.g., Active Directory) and get a comprehensive view of the identity posture of the network domain 644, risky users, risky user devices (e.g., computers, mobile devices, etc.), misconfigurations (or incorrectly configured network systems that can expose identity information, vulnerabilities, weaknesses, etc. that may exist in the directory 658. The identity attack-surface visibility component 650 may also be configured to produce a MITRE ATT&CK mapping that can help the admin 660 to locate blind spots and prioritize where to focus.

The identity attack-surface visibility component 650 of the ITDR module 648 may be configured to audit the directory 658 by running Lightweight Directory Access Protocol (LDAP) queries to build a map of schema, users, computers, Organization Units (Ous), and other objects in the directory 658 or identity store. It can then run checks against these objects to find misconfigurations and vulnerabilities that exist in the directory 658.

Furthermore, the identity attack-surface visibility component 650 may be configured to assess the directory 658 (e.g., Active Directory), where the ITDR module 648 can run on the client connector 646 installed on a domain-joined Windows machine (i.e., user device 642). A security team can set up a scan by specifying the Active Directory domain (e.g., network domain 644) they wish to access and selecting the client connector (e.g., client connector 646) of the user device (e.g., user device 642) from which to run the scan. Depending on the size of the Active Directory, it might take anywhere between 15 mins to 30 minutes to complete the assessment. Once the assessment is complete, the results are available to the admin 660, who can then view them in a dashboard, as described in more detail below with respect to FIGS. 13A-13E. The assessment, for example, may include a domain risk score, focus areas to prioritize remediation, a list of the riskiest users and computers, a basic analysis of severity and risk categorizations, MITRE ATT&CK kill chain mapping, and/or a complete list of misconfigurations discovered.

For each misconfiguration (or identity vulnerable configuration), the solution can provide one or more of the following:
1. Risk categorization
2. Severity
3. Remediation effort
4. MITRE ATT&CK ID and tactic
5. Explanation of the issue
6. Potential impact
7. List of users, computers, and objects affected
8. Remediation guidance
9. Video tutorials
10. Scripts
11. Commands § 9.5 General Identity Hygiene Management Methodologies Once the admin 660 has visibility into the identity attack-surface of the network domain 644, the second step is to build "identity hygiene." The identity hygiene management component 652 of the ITDR module 648, along with cooperating applications in the Zero Trust system 624, is configured to provide real-time monitoring of critical changes in the Active Directory that introduce new risks and open up pathways for attackers to escalate privileges and move laterally. In addition to real-time alerting, the identity hygiene management component 652 is configured to give the admin 660 remediation guidance in the form of video tutorials, commands, and scripts that can be used to resolve issues. This guidance can be displayed on a user interface of the server 656. Once an assessment has been configured, security teams have the ability to turn on change detection for the Active Directory domain. Change detection may include uncovering configuration changes that affect the security posture of the Active Directory in near real-time, allowing security teams, admin teams, or admin 660 to quickly respond and remediate.

Furthermore, the ITDR module 648 is configured to run a series of high-priority configuration checks against Active Directory. The scope of these checks targets the discovery of issues that have the highest possibility of abuse by adversaries. These checks may be configured to run every 15 minutes from the client connector 646 installed on a specific endpoint device (e.g., user device 642) for a given domain (e.g., network domain 644). Changes may be marked as having a good or bad impact, where a good impact indicates that an issue has been resolved and a bad impact indicates a potential issue has been introduced.

§ 9.6 General Identity Threat Detection Methodologies

It should be noted that not all identity issues and misconfigurations can easily be remediated. For example, some configuration settings for a domain may be business-critical and cannot be changed without interrupting various business practices. However, this can leave some organizations open to exploitation in the event of a compromise. Therefore, the last step of the ITDR module 648 is to be able to detect identity attacks that bypass existing defenses and leverage these misconfigurations to escalate privileges and move laterally. The ITDR module 648, via at least the identity threat detection component 654, is configured to provide high-fidelity detection for attacks like DCSync, DCShadow, Kerberoasting, session enumeration, privileged account access, LDAP enumeration, and more.

The ITDR module 648 is configured with a threat-detection capability that alerts SOC teams and threat hunters of malicious activities directed toward potentially malicious misuse and theft of identities. Identity Threat Detection can be turned on as an endpoint policy on designated client-connector-installed machines. Security teams can choose to turn on all or a combination of detectors on designated endpoints. If a pattern is noticed, the client connector 646 is configured to signal the server 656 that a threat has been detected. The ITDR policies are configured to enrich the threat signal with information relevant to the security team to perform an investigation. Then, the security team can configure orchestration capabilities in the ITDR system 620 or identity protection system 640 to take automated actions with respect to alerting, forwarding, remediation, etc.

The following description is related to user interfaces (e.g., I/O interfaces 204) associated with a server (e.g., server 200, 656 or other control device). An admin or security team may be configured to interact with the user interfaces according to an identity security posture of a domain or directory, change detection, and active or perceived identity threats. Thus, the admin can respond to information regarding risks, config changes, detected threats, etc. In particular, the admin may interact with the user interfaces using various dashboards, such as the dashboards described below with respect to FIGS. 13-15.

§ 9.7 Identity Attack-Surface Visibility Dashboards

As mentioned above with respect to § 9.4, for example, the first step in the efforts to protect identity is to gain visibility into configuration issues and access permission issues that can aid an attacker or adversary in the malicious efforts to escalate privileges and move laterally. Thus, the first capability pillar of defense against such attacks is Identity Attack Surface Visibility.

Figure 13A:
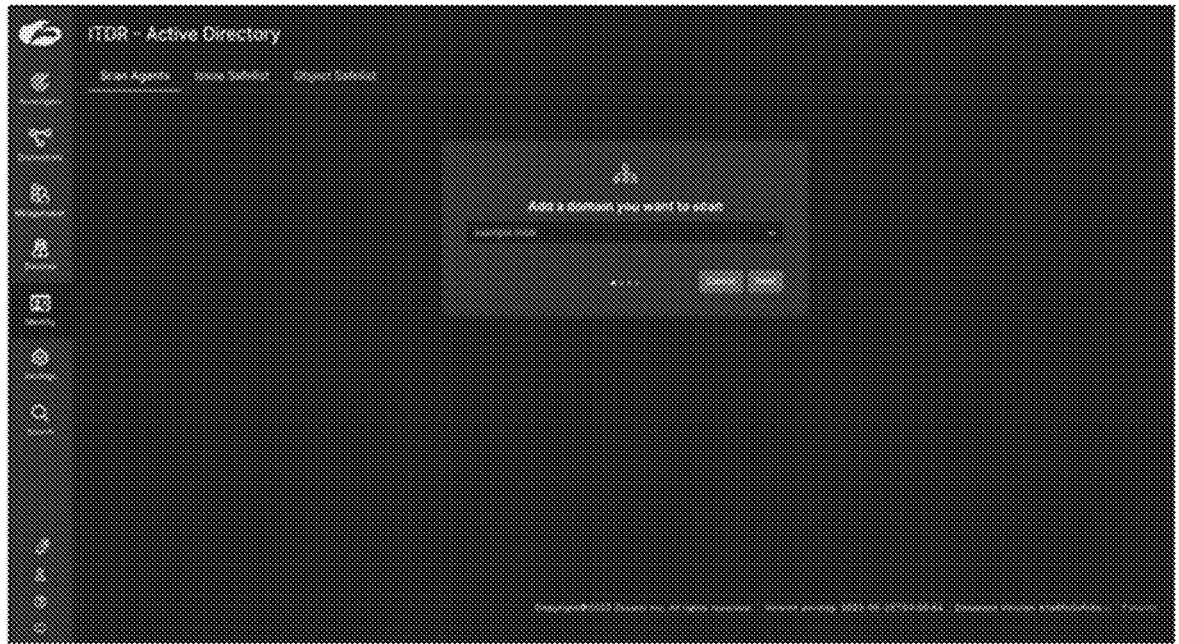
FIGS. 13A-13E are screenshots showing examples of dashboards related to Identity Attack-Surface Visibility.

FIG. 13A is a screenshot showing an example of a dashboard in which a scan can be set up that will continuously assess a directory (e.g., Active Directory, identity store, etc.) for a client to find misconfigurations and issues that can open up attack paths. The user (admin) can simply add the Active Directory domain you want to assess.

Figure 13B:
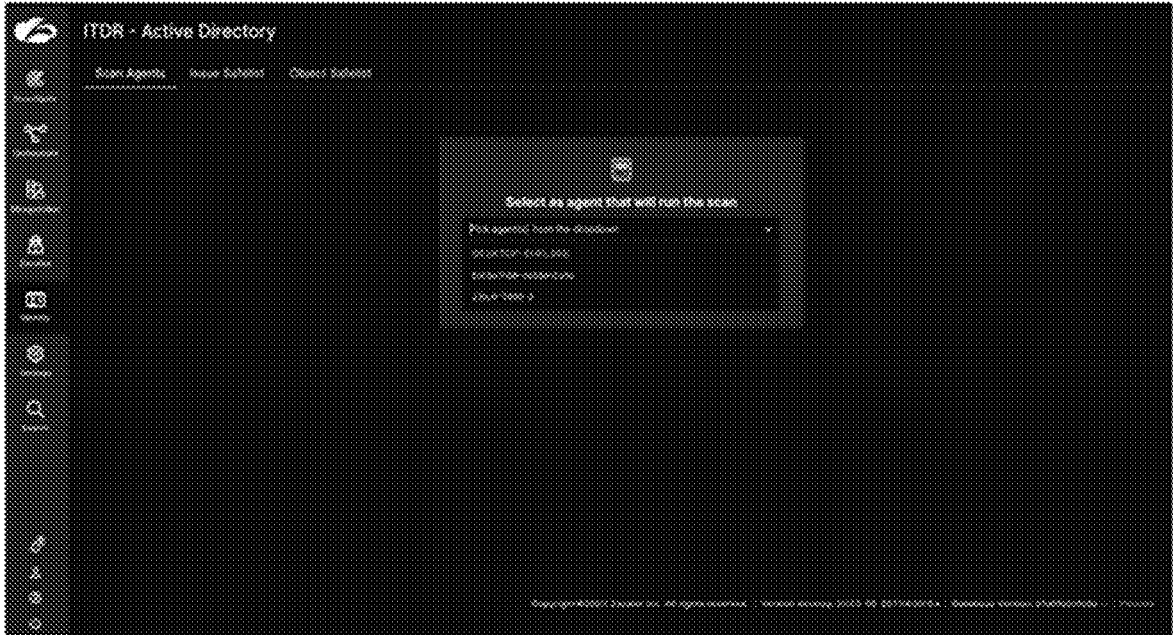

FIG. 13B is a screenshot showing an example of a dashboard in which the user can select a user device (e.g., user device 642) or client connector 646 installed on such an endpoint device that is domain-joined. This allows the user to select where the scan is going to run from. By building this capability into the client connector 646, IT would not need to install another agent in the identity protection system 640. In addition to securely connecting users to applications and resources, and monitoring performance issues, the client connector 646 is also configured to continuously assess the directory (e.g., Active Directory).

Figure 13C:
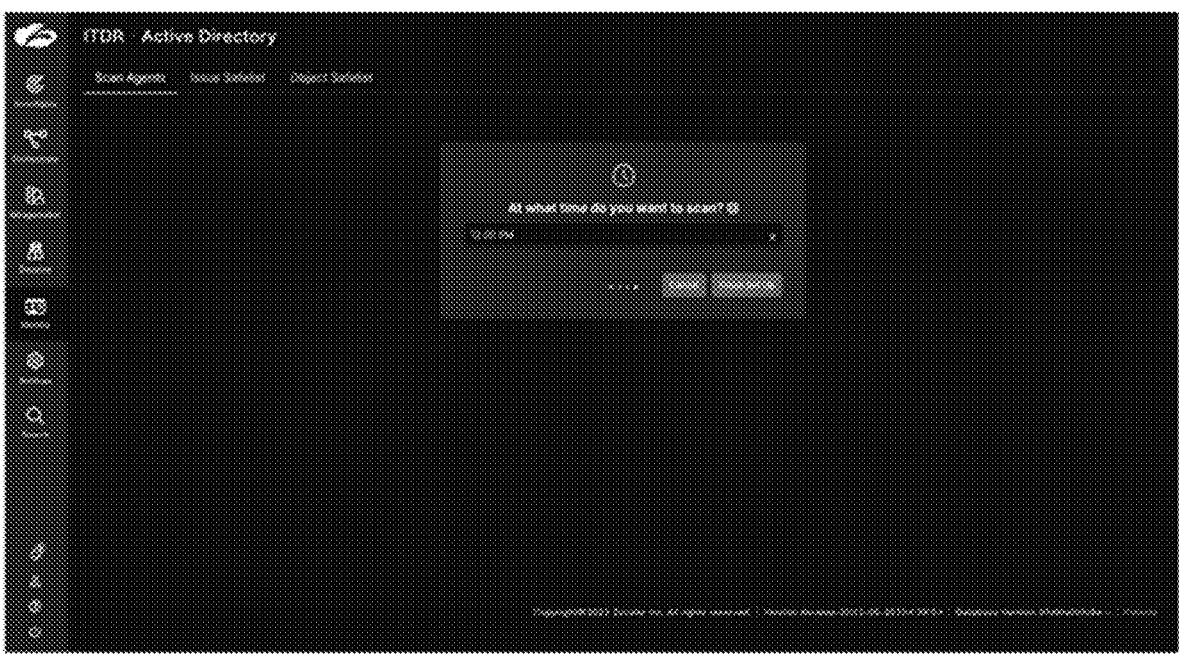

FIG. 13C is a screenshot showing an example of a dashboard in which the user can select when they would like to run the scan. For example, depending on the size of the Active Directory, it may take anywhere between 15 to 30 minutes for the ITDR module 648 to complete the first assessment.

Figure 13D:
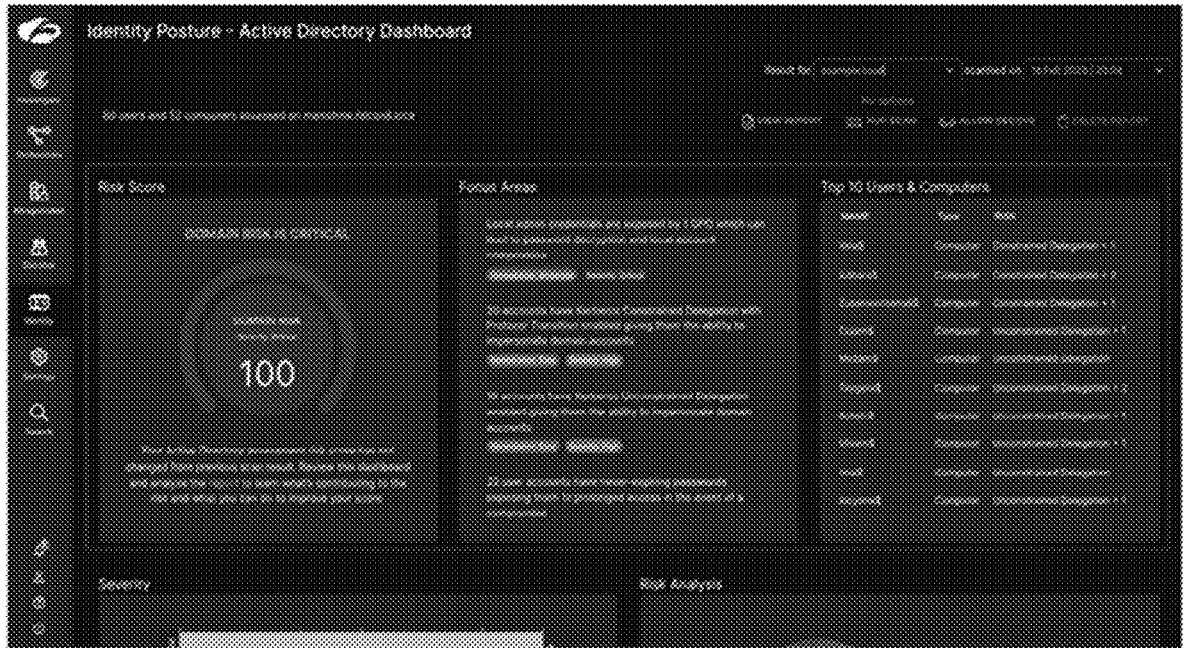

FIG. 13D is a screenshot showing an example of a dashboard in which, after waiting for first assessment to run, the user can get full visibility into the state of their Active Directory. This dashboard includes, among other things, a domain risk score, which tells the user the degree of risk that the identity information or Active Directory has. This can be demonstrated on a scale from 0 to 100. Also, the dashboard shows a list of the focus areas, which are essentially risky configuration settings (misconfigurations) that that the ITDR module 648 can make recommendations to allow the user to prioritize remediation efforts based on which of these will have the most impact on risk reduction. The dashboard can also provide a list of your riskiest users and computers to help the user start looking into risky identities.

Figure 13E:
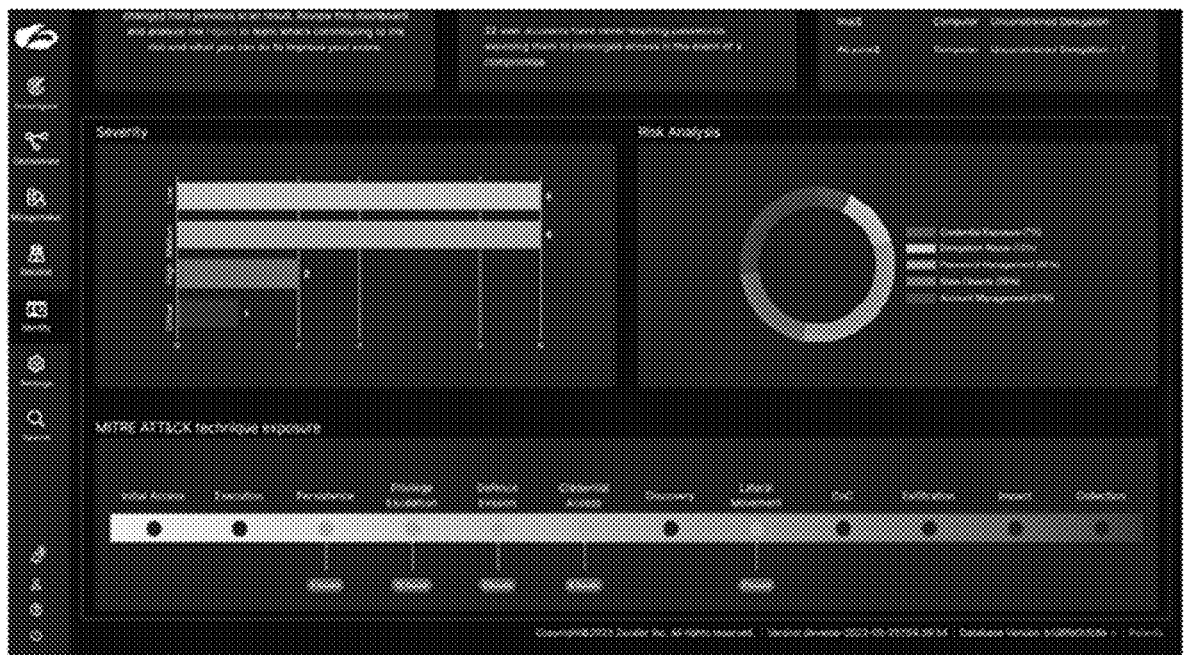

FIG. 13E is a screenshot showing an example of a dashboard in which the user can scroll through and see a high level analysis of severity and types of risks that exist in the Active Directory. The dashboard also includes a mapping of detected identity issues to a MITRE ATT&CK kill chain, which can indicate to the user exactly where there is vulnerability in the event of an attack.

§ 9.8 Identity Hygiene Management Dashboards

Once the user has visibility as demonstrated by the dashboards of FIGS. 13A-13E, the user can then take steps to fix these identity issues and misconfigurations. This is where our second ITDR capability comes in—identity hygiene management.

Figure 14A:
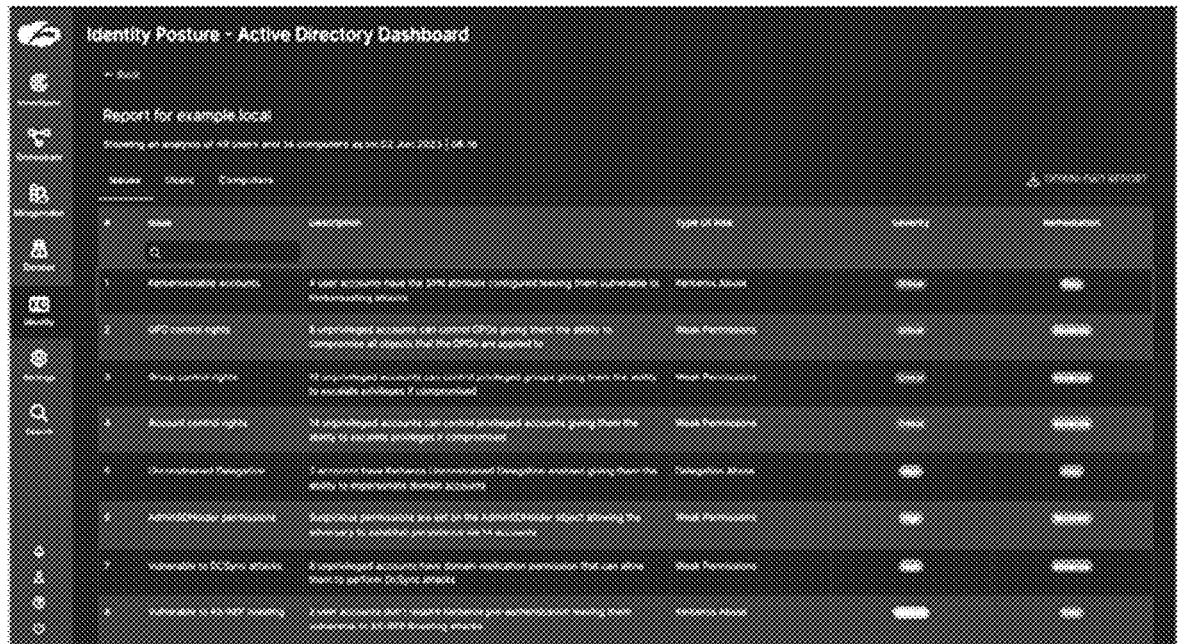
FIGS. 14A-14E are screenshots showing examples of dashboards related to Identity Hygiene Management.

FIG. 14A is a screenshot showing an example of a dashboard in which the user can see a complete list of misconfigurations (or risky configurations) and issues that were discovered. The user can then start working through them one by one.

Figure 14B:
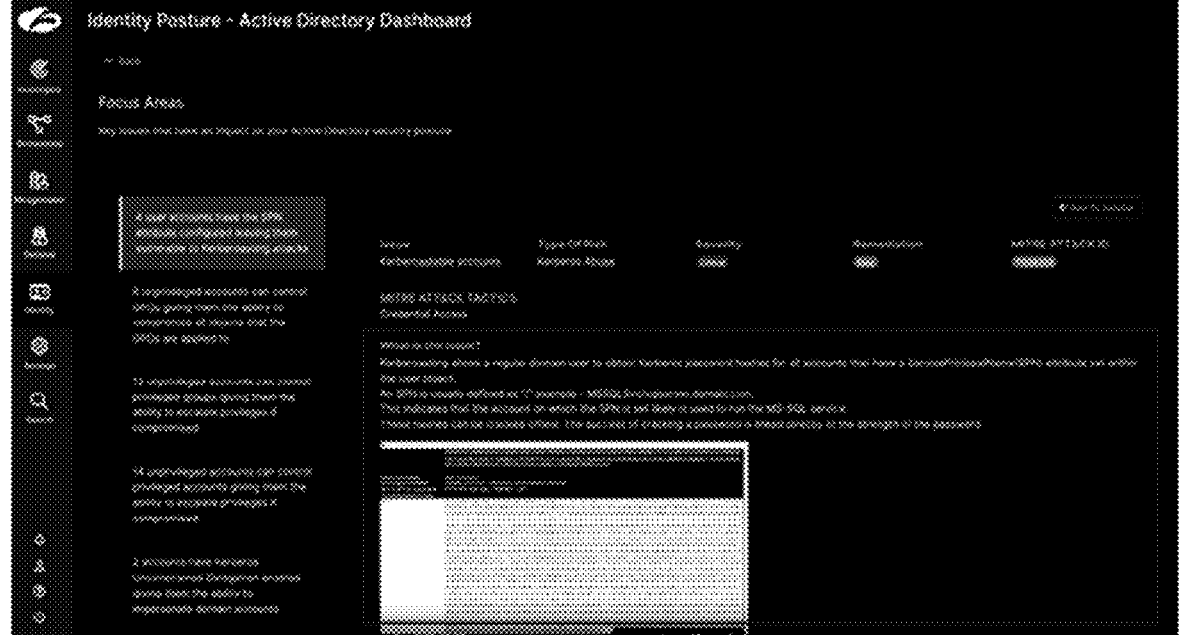

FIG. 14B is a screenshot showing an example of a dashboard in which, when the user clicks on an issue, he or she can see an explanation that describes how an adversary can exploit this issue. For example, this explanation can be provided in the form of an instructional video, which the user can view on the dashboard.

Figures 14C, 14D:
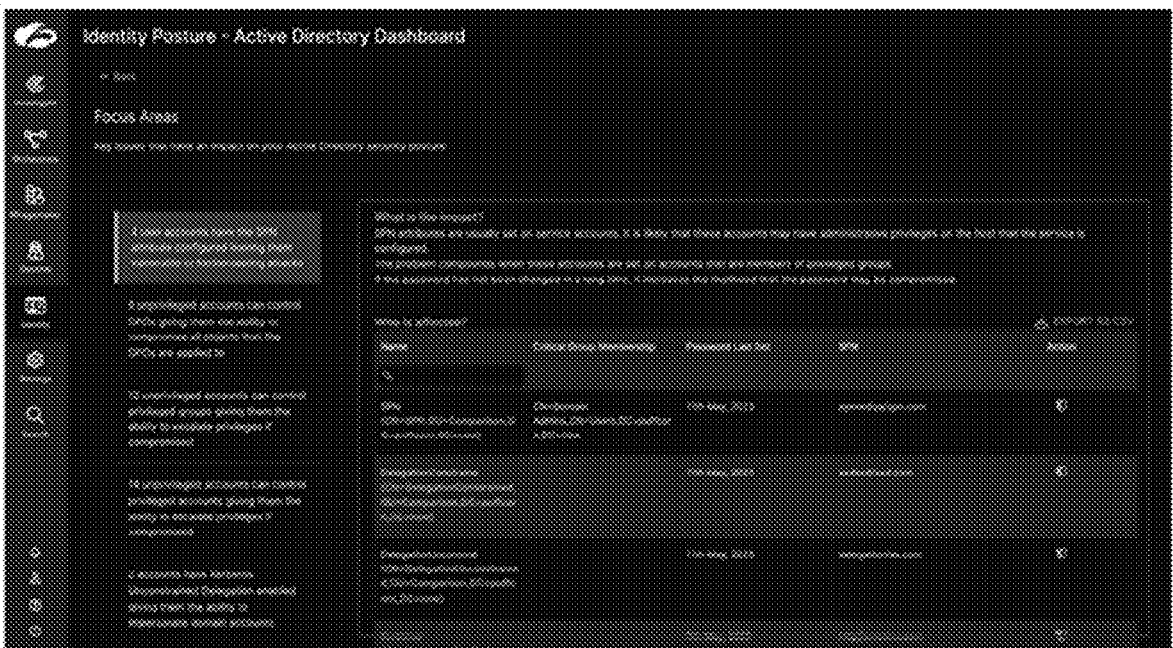

FIG. 14C is a screenshot showing an example of a dashboard providing an explanation of the impact that the selected issue can cause if it is exploited by an attacker. This can be provided along with a list of users that could potentially be impacted by it.

FIG. 14D is a screenshot showing an example of a dashboard that gives the user remediation guidance. This can be in the form of a video tutorial, written steps to fix it, etc. The dashboard can also include commands and scripts that the user can run to remediate the issue.

Figure 14E:
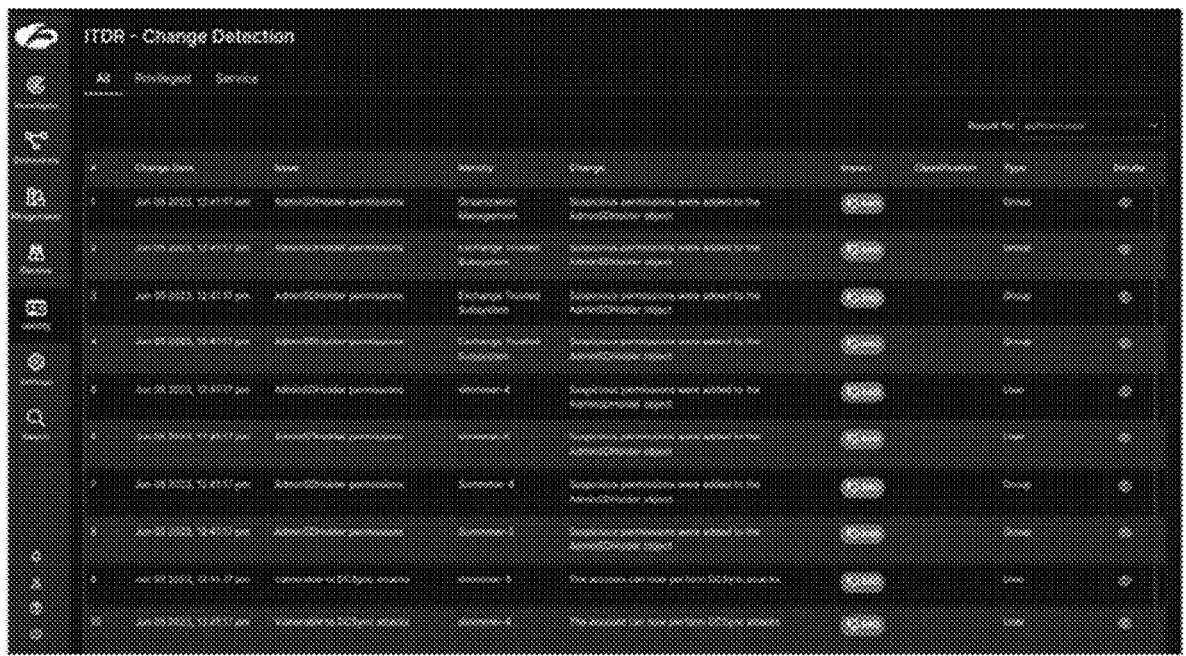

FIG. 14E is a screenshot showing an example of a dashboard allowing change detection capabilities in addition to hygiene management. In this regard, the dashboard can alert the user about risky changes and additions to the Active Directory. The detection and alerting processes can be performed in near real time so that the user can act quickly to resolve them.

§ 9.9 Identity Threat Detection Dashboards

The third pillar of ITDR includes Identity Threat Detection and response that a user can take to remediate these threats. Again, as a result of certain domain configurations that may expose a directory to attacks based on business-related policies, not all configuration issues can be remediated upfront. Sometimes, a business may need to leave things that are critical for business operations in a current posture since revoking access permissions may interrupt the normal business operations. Thus, when identity threads are detected, the following dashboards may be used to allow an admin or security team to manage these attacks.

Figure 15A:
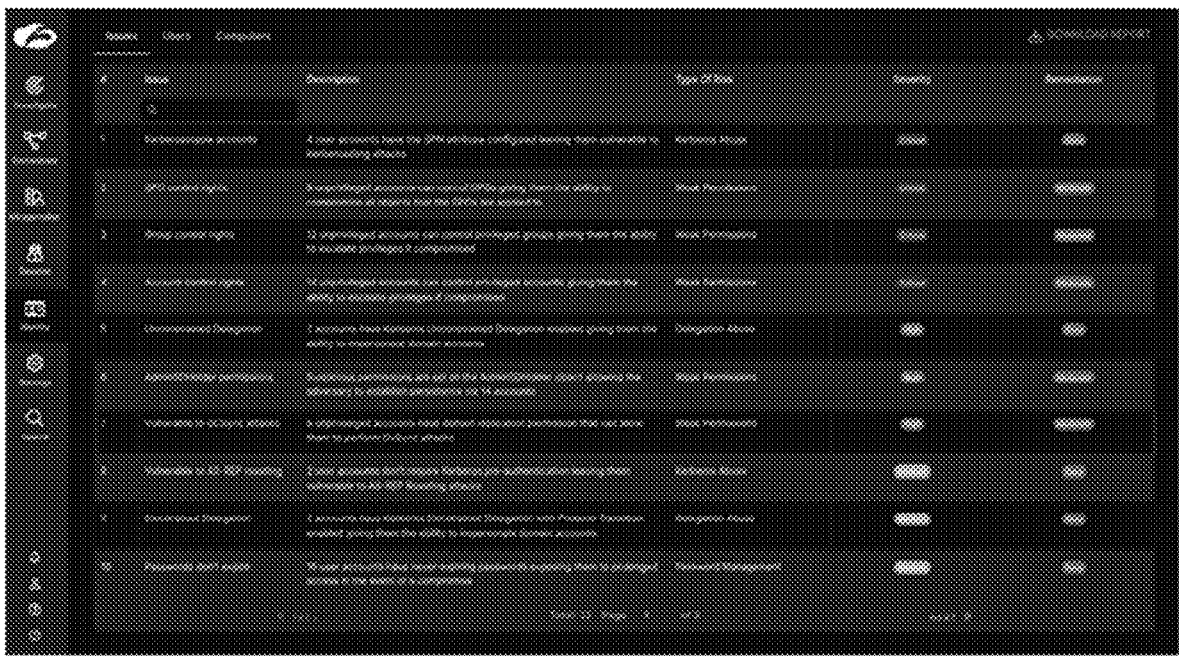
FIGS. 15A-15H are screenshots showing examples of dashboards related to Identity Threat Detection Dashboards.

FIG. 15A is a screenshot showing an example of a dashboard in which a user can review a report. From the report, the user can find one or more issues that might leave certain end users vulnerable to a DCSync attack.

Figure 15B:
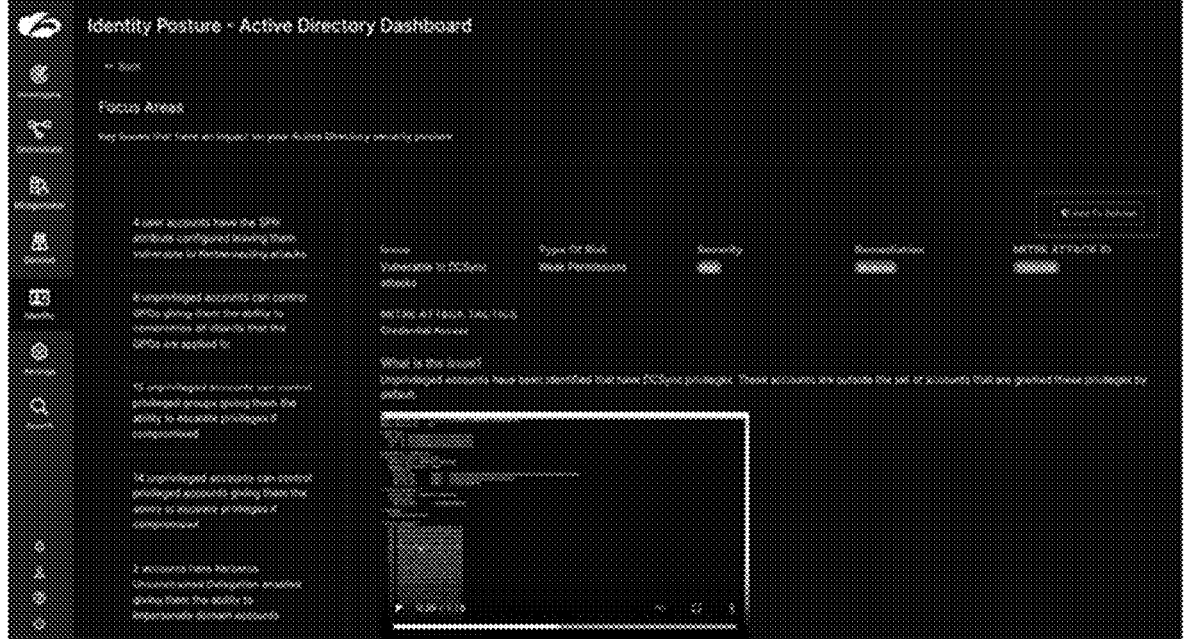

FIG. 15B is a screenshot showing an example of a dashboard showing that an issue cannot be remediated based on business reasons. This dashboard therefore allows the user to decide whether or not to add this issue to a safelist. Issues placed in the safelist, for example, may be removed from an assessment report and may no longer contribute to a risk score. However, the dashboard may remind the user that the risk continues to exist.

Figure 15C:
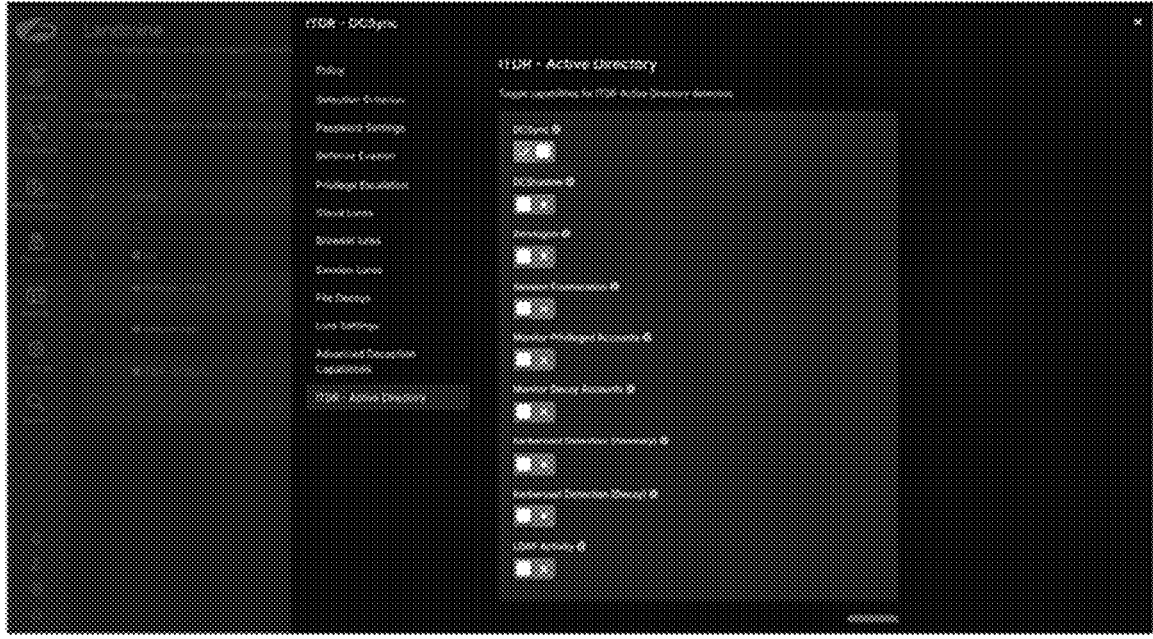

FIG. 15C is a screenshot showing an example of a dashboard in which risk can be mitigated. The ITDR module 648 is configured to provide the ability to create an endpoint policy for detecting several identity attacks (e.g., DCSync).

Figure 15D:
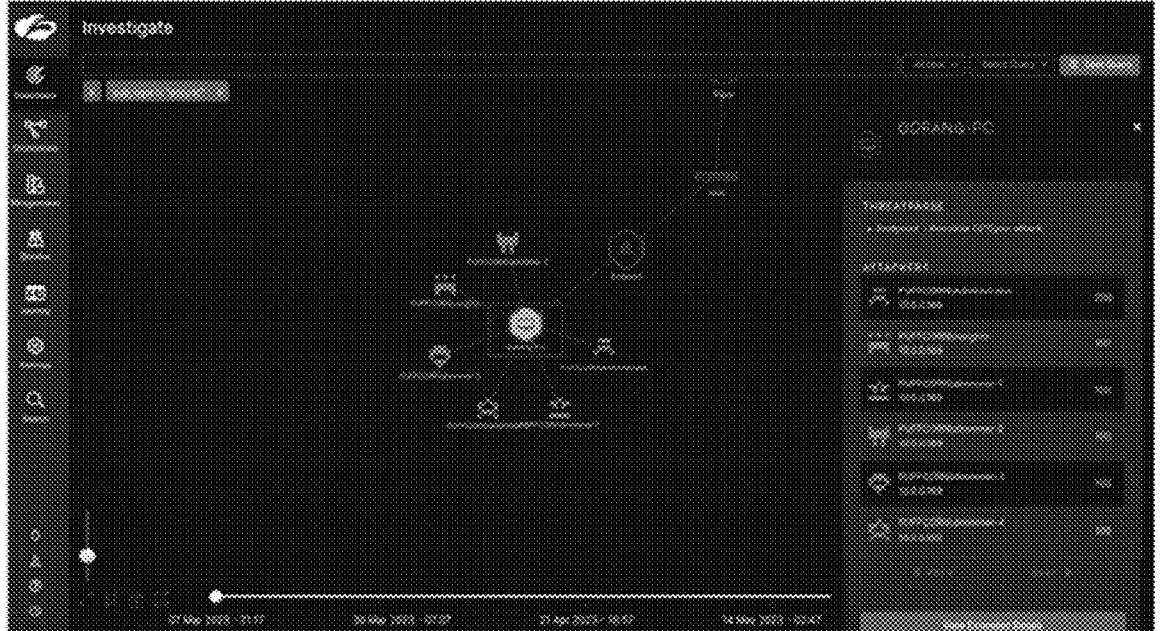

FIG. 15D is a screenshot showing an example of a dashboard in which, once the user has created a policy and activated DCSync detection, the dashboard may suggest to the user that any attacker attempting to exploit the weakness will be detected in real time. By clicking on the endpoint being attacked, the user can see a list of attackers exploiting this misconfigurations. Thus, the ITDR module 648 can further mitigate the risk of identity threats by detecting identity attacks in real time. It may be noted that the identity protection system 640 does not stop at detection. Because the Zero Trust system 624 has contextual awareness of identity risk and ongoing attacks, it can contain the threat by blocking the compromised user from accessing anything in the environment.

Figure 15E:
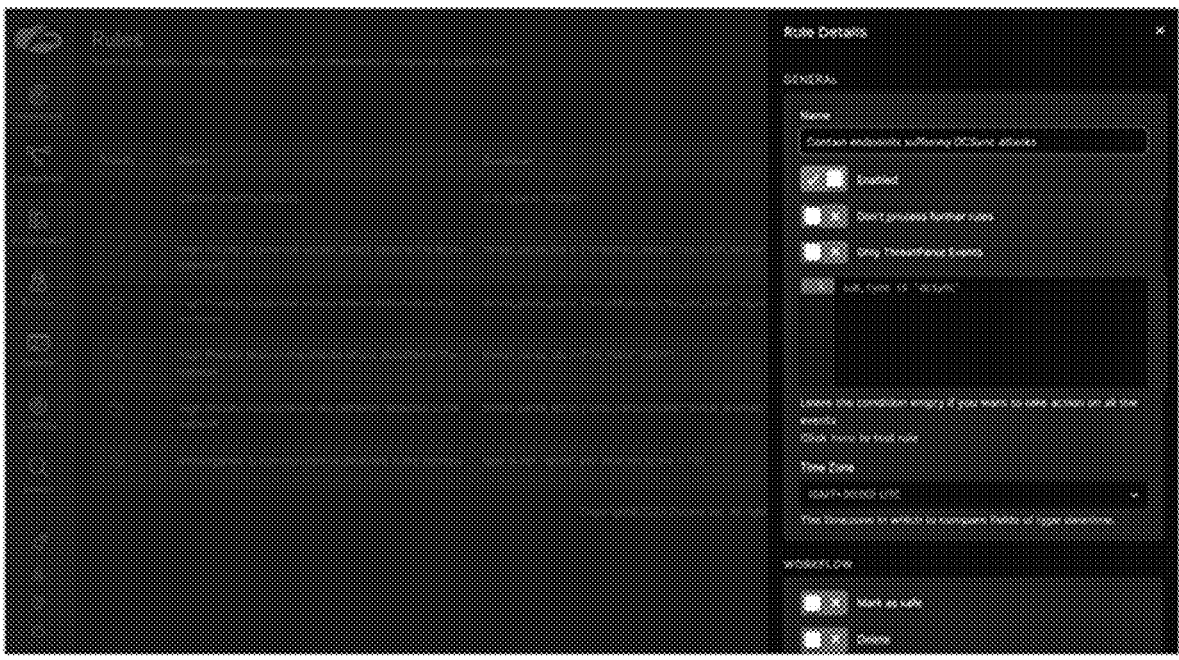

FIG. 15E is a screenshot showing an example of a dashboard in which the user can set up an orchestration rule to contain endpoints suffering from a certain attack, such as a DCSync attack.

Figure 15F:
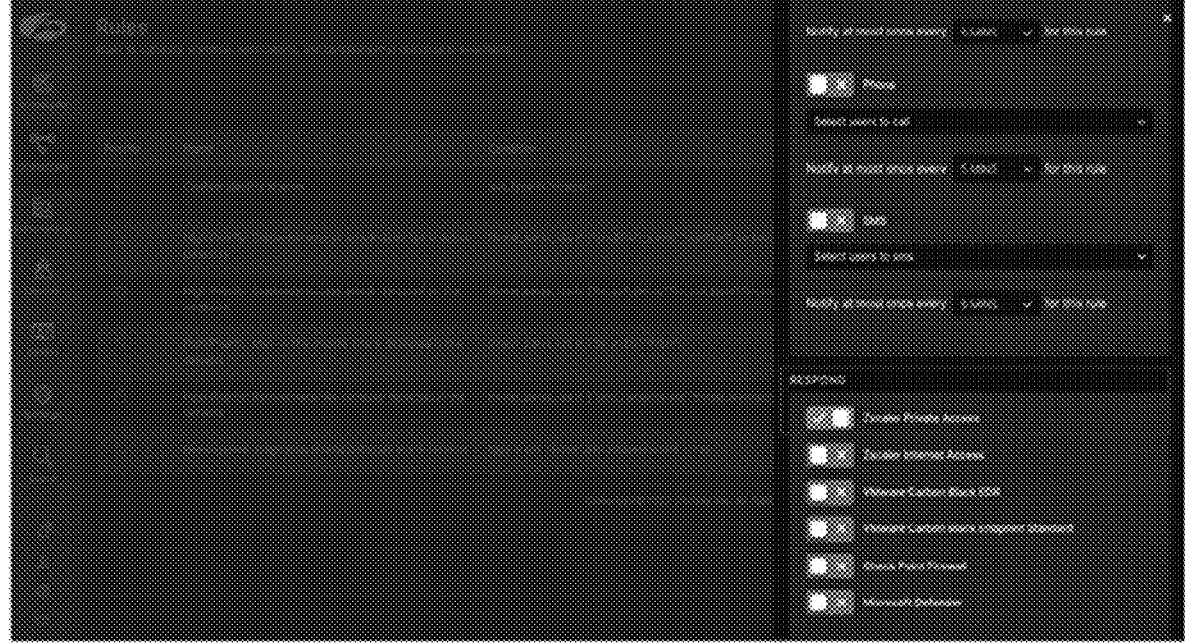

FIG. 15F is a screenshot showing an example of a dashboard in which the user can turn on a response action instructing the Zero Trust system 624, a ZTNA system, or a ZPA policy system to contain the endpoint in the event of a DCSync attack. In this case, the user can rest easy that the Zero Trust system 624 can handle the threat.

Figure 15G:

FIG. 15G is a screenshot showing an example of a dashboard in which a DCSync attack is detected.

Figure 15H:
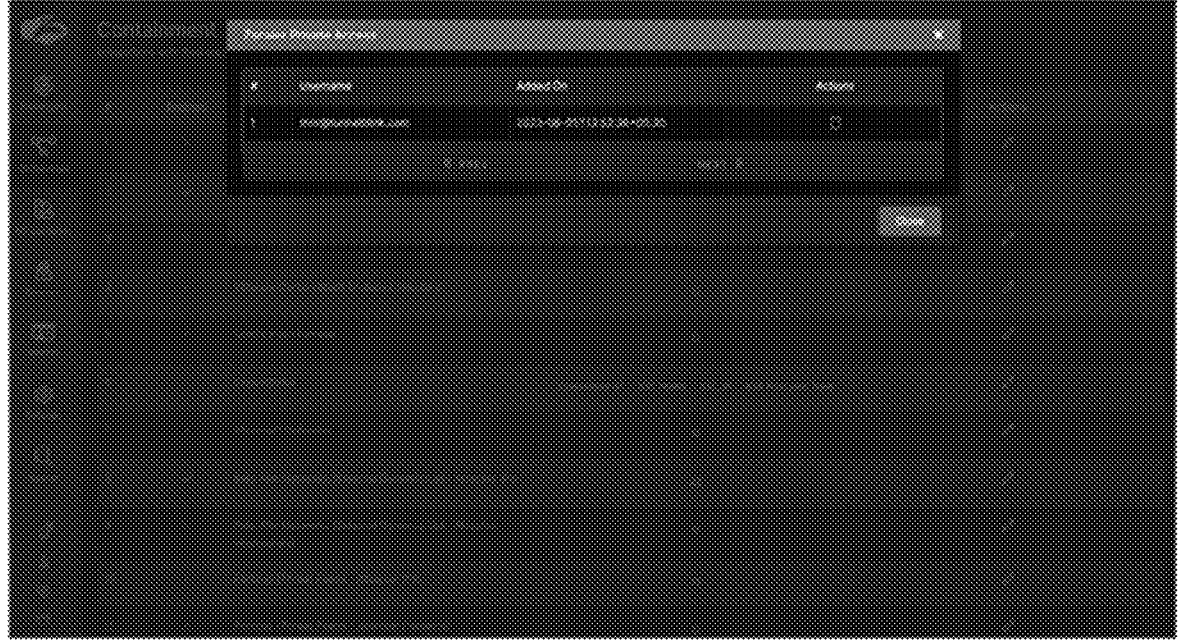

FIG. 15H is a screenshot showing an example of a dashboard in which a ZPA policy is configured to kick in. The attacker or compromising user is cut-off from the environment in real time.

Figure 16:
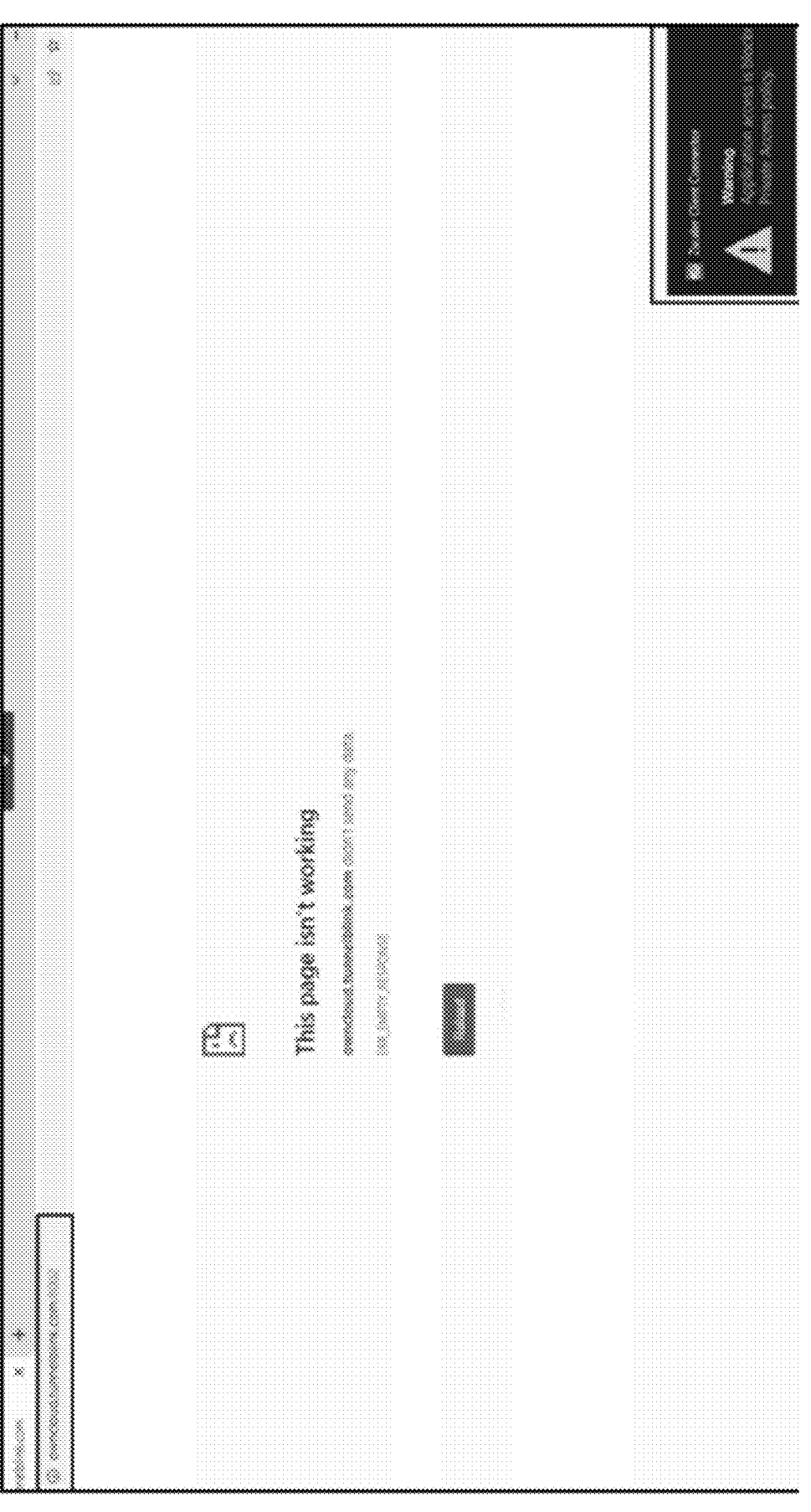
FIG. 16 is a screenshot showing an example of a display provided to an attacker when an attack has been thwarted.

FIG. 16 is a screenshot showing an example of a display provided to an attacker when an attack has been thwarted. As shown, an attempt by the attacker to access internal applications is blocked by ZPA.

§ 9.10 Identity Protection Method

FIG. 17 is a flowchart illustrating an embodiment of a method 680 for protecting identity information. As shown in FIG. 17, the method 680 includes the step of conducting a scan of a directory of a network domain to gain visibility of one or more vulnerabilities of the directory, as indicated in block 682. For example, the one or more vulnerabilities may define a potential security risk that would allow an attacker to leverage identity-related information from the directory. The method 680 further includes the step of guiding an administrator regarding management of the directory to reduce the potential security risk, as indicated in block 684. Also, the method 680 includes the step of monitoring the directory for one or more attacks to leverage the identity-related information, as indicated in block 686.

The method 680 may be incorporated in memory or other non-transitory computer-readable media and may include instructions for enabling a processing device to perform the steps for protecting identity information. The functionality of the method 680 may be incorporated in a system or device, such as a user device or endpoint device configured to remotely access the directory via a Zero Trust Network Access (ZTNA) system. The memory is further configured to store a client connector application allowing the user device to communicate with a server that allows the administrator to enter configuration settings for the directory. The server may enable the administrator to select a domain directory on which the scan is conducted and to select a user system from which the scan is launched.

The method 680 may also include displaying information on a user interface. The method 680 may include displaying the one or more vulnerabilities on the user interface to represent a security posture of the directory. In some embodiments, the method 680 may also include the step of displaying, on the user interface, one or more of a) a risk score related to the potential security risk, b) a list of the one or more vulnerabilities, c) a prioritized list of issues that need remediation, d) a list of the riskiest users using the network domain, e) a list of the riskiest computers in the network domain, and f) a mapping of identity issues in a MITRE ATT&CK kill chain. Also, the method 680 may include the step of displaying, on the user interface, guidance information including one or more of a) an explanation of how an attacker can exploit the one or more vulnerabilities, b) an impact that the one or more vulnerabilities can have if exploited, c) a list of users that would be impacted if the one or more vulnerabilities were exploited, and d) a set of steps or a video tutorial for remediating the one or more vulnerabilities.

For an unresolved issue of the one or more vulnerabilities, the method 680 may further include the step of placing the unresolved issue in a safelist and then specifically monitoring for exploitation of the unresolved issue. In response to detecting a change to configuration settings associated with the directory, the method 680 may alert the administrator, in real time, if the change introduces additional vulnerabilities to the directory. In response to detecting one or more attacks to leverage the identity-related information from the directory, the method may display a list of one or more attackers attempting to exploit the one or more vulnerabilities.

The method 680 may work with a Zero Trust Network Access (ZTNA) system to perform ongoing monitoring of attacks and to contain an attack by blocking an attacker from accessing the identity-related information from the directory. The step of conducting the scan (block 682) may include the step of assessing a vulnerability posture of an attack surface of the directory. The step of guiding the administrator (block 684) may include the step of config-
uring the directory to avoid new risks and setting alerts when
risks are detected. The step of monitoring for one or more
attacks (block 686) may include performing high-fidelity
detection of one or more of a DCSync attack, a DCShadow
attack, and a Lightweight Directory Access Protocol
(LDAP) enumeration attack.

The directory, for example, may be a database associated
with an Active Directory (AD). The identity-related infor-
mation, for example, may include one or more of an identity
of a user, credentials of a user, privileges of a user, and
access rights of a user. The one or more vulnerabilities, for
example, may include one or more misconfigurations, con-
figuration settings that expose weaknesses, potential risks,
and possible areas of exploitation.

Therefore, according to the various systems and methods
of the present disclosure, the ITDR functionality includes
novel innovations in identity-first security. The ITDR sys-
tems and methods provide visibility into the identity attack
surface, detects attacks against identities and identity sys-
tems, and mitigates risk by closing the loop on hygiene,
containment, and remediation. It can be built into a Client
Connector so that a security team or IT does not need to
install additional agents or use Virtual Machines (VMs). The
identity protection can be incorporated into the Zero Trust
system 624 to leverage policy based decisions and access
control. Also, it supports integrations with all the leading
Security Information and Event Management (SIEM) solu-
tions and EDR solutions to augment Security Operations
Center (SOC) workflow.

In some embodiments, the ITDR system can be incorpo-
rated in a cloud-based Zero Trust Network Access (ZTNA)
architecture, which may be configured to reduce an external
attack surface, reduce external resource access, and verify
every user. Assessing vulnerability posture, in some cases,
may include determining a state of an identity posture, risky
users and computers, misconfigurations, vulnerabilities,
and/or MITRE ATT&CK mapping that exist on the data-
base. Remediation guidance in the "hygiene" pillar may
include providing video tutorials, commands, and/or scripts
that can be used (by an admin) to resolve issues. Also,
regarding the third pillar, the ITDR systems and methods
may include high-fidelity detection for attacks like DCSync,
DCShadow, LDAP enumeration, etc.

§ 9.11 Benefits

With the ITDR systems and methods of the present
disclosure, there are no additional agents or VMs required.
They can be built into the Client Connector, which allows
the ITDR systems to unlock new capabilities and protections
out-of-the-box. Also, they can be integrated with access
policies. The Zero Trust system 624 can dynamically apply
access policy controls to block compromised users when an
identity attack is detected.

Regarding SOC integrations, the systems and methods of
the present disclosure can strengthen investigation and
response with Integrations that include EDRs, like Crowd-
strike, Microsoft Defender, VMware CarbonBlack, and all
leading SIEMs. Also, the systems and methods of the
present disclosure can provide Identity Protection that can
strengthen the Zero Trust posture of a domain by mitigating
the risk of user compromise and privilege exploitation.
Regarding quantifying identity risk, the systems and meth-
ods of the present disclosure can allow an admin to know
how, why, and where their users and devices are at risk. An
identity security assessment generates a risk score to quan-
tify and track the posture of your identity attack surface.
Regarding the aspect of finding misconfigurations, the systems and methods of the present disclosure can uncover
issues that allow attackers to gain the upper hand. This
allows the admin to discover risky configurations, like GPP
password exposure, unconstrained delegation, and stale
passwords that open up new attack paths.

Furthermore, regarding remediation issues, the systems
and methods of the present disclosure build strong identity
hygiene with remediation guidance. This allows the admin
to understand the issue, impact, and who is affected. They
can leverage step-by-step remediation guidance along with
video tutorials, scripts, and commands. Regarding monitor-
ing in real-time, the systems and methods of the present
disclosure can provide alerts when configuration changes
introduce risk. This will allow an admin to know about
identity stores that are in constant flux with configuration
and access permission changes. Thus, the systems and
methods of the present disclosure can monitor in real-time to
allow the admin to get alerted to new risks and issues.
Regarding the detection of identity attacks, the systems and
methods of the present disclosure are configured to stop
privilege escalation with Identity Threat Detection. Since
not all misconfigurations can be remediated, the systems and
methods of the present disclosure can detect and stop attacks
like DCSync, DCShadow, Kerberoasting, and more in the
case of a compromise.

It should be noted that the ITDR systems and methods
introduce a new class of Identity-centric security control that
provides visibility into the identity attack surface, detects
attacks against identities and identity systems, and mitigates
risk by closing the loop on hygiene, containment, and
remediation. With attackers using identity compromise as
the preferred route to a breach, ITDR provides a pragmatic
approach to identity-first security to mitigate the risk of
threats that bypass existing defenses.

§ 10.0 Conclusion

It will be appreciated that some embodiments described
herein may include one or more generic or specialized
processors ("one or more processors") such as microproces-
sors; Central Processing Units (CPUs); Digital Signal Pro-
cessors (DSPs): customized processors such as Network
Processors (NPs) or Network Processing Units (NPUs),
Graphics Processing Units (GPUs), or the like; Field Pro-
grammable Gate Arrays (FPGAs); and the like along with
unique stored program instructions (including both software
and firmware) for control thereof to implement, in conjunc-
tion with certain non-processor circuits, some, most, or all of
the functions of the methods and/or systems described
herein. Alternatively, some or all functions may be imple-
mented by a state machine that has no stored program
instructions, or in one or more Application Specific Inte-
grated Circuits (ASICs), in which each function or some
combinations of certain of the functions are implemented as
custom logic or circuitry. Of course, a combination of the
aforementioned approaches may be used. For some of the
embodiments described herein, a corresponding device such
as hardware, software, firmware, and a combination thereof
can be referred to as "circuitry configured or adapted to,"
"logic configured or adapted to," etc. perform a set of
operations, steps, methods, processes, algorithms, functions,
techniques, etc. as described herein for the various embodi-
ments.

Moreover, some embodiments may include a non-transi-
tory computer-readable storage medium having computer
readable code stored thereon for programming a computer,
server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. The foregoing sections include headers for various embodiments and those skilled in the art will appreciate these various embodiments may be used in combination with one another as well as individually.

What is claimed is:

1. A system comprising:
a processor; and
memory configured to store computer logic having instructions enabling the processor to perform the steps of:
conducting a proactive identity-centric scan of a directory of a network domain by executing Lightweight Directory Access Protocol (LDAP) queries from an endpoint device joined to the domain to enumerate directory schema objects, user accounts, computers, organizational units, and configuration parameters and to identify misconfigurations, excessive privileges, or risky entitlements;
computing, from results of the scan, an identity risk posture representing an identity attack-surface visibility for the directory;
guiding an administrator via a user interface by presenting remediation guidance for the identified vulnerabilities, the guidance including one or more of a risk score, a prioritized remediation list, an explanation of potential exploitation paths, or a MITRE ATT&CK mapping, to enable configuration of the directory to reduce the potential security risk; and
monitoring the directory in real time for identity-based attacks leveraging the identified vulnerabilities, including high fidelity detection of at least one of a DCSync attack, a DCShadow attack, Kerberoasting, or LDAP enumeration, and automatically signaling a Zero Trust Network Access (ZTNA) system to contain the attack by blocking a compromised user or endpoint from accessing protected resources.

2. The system of claim 1, wherein the system is a user device configured to remotely access the directory via the Zero Trust Network Access (ZTNA) system.

3. The system of claim 2, wherein the memory is further configured to store a client connector application allowing the user device to communicate with a server that allows the administrator to enter configuration settings for the directory.

4. The system of claim 3, wherein the server enables the administrator to select a domain directory on which the scan is conducted and to select a user system from which the scan is launched.

5. The system of claim 1, further comprising a user interface, wherein the instructions further enable the processor to display the one or more vulnerabilities on the user interface to represent a computed identity-risk posture of the directory.

6. The system of claim 5, wherein the instructions further enable the processor to display, on the user interface, one or more of a) a risk score related to the potential security risk, b) a list of the one or more vulnerabilities, c) a prioritized list of issues that need remediation, d) a list of the riskiest users using the network domain, e) a list of the riskiest computers in the network domain, and f) a mapping of identity issues in a MITRE ATT&CK kill chain and a summary of recommended configuration changes.

7. The system of claim 5, wherein the instructions further enable the processor to display, on the user interface, guidance information including one or more of a) an explanation of how an attacker can exploit the one or more vulnerabilities, b) an impact that the one or more vulnerabilities can have if exploited, c) a list of users that would be impacted if the one or more vulnerabilities were exploited, and d) a set of steps or a video tutorial for remediating the one or more vulnerabilities.

8. The system of claim 1, wherein the instructions further enable the processor to work with a Zero Trust Network Access (ZTNA) system to perform ongoing monitoring of attacks and to contain an attack by blocking an attacker from accessing the identity-related information from the directory.

9. The system of claim 1, wherein the step of conducting the scan includes the step of assessing a vulnerability posture of an attack surface of the directory.

10. The system of claim 1, wherein monitoring for one or more attacks includes performing high-fidelity detection of one or more of a DCSync attack, a DCShadow attack, and a Lightweight Directory Access Protocol (LDAP) enumeration attack.

11. The system of claim 1, wherein the directory is a database associated with an Active Directory (AD).

12. The system of claim 1, wherein the identity-related information includes one or more of an identity of a user, credentials of a user, privileges of a user, and access rights of a user.

13. The system of claim 1, wherein the one or more vulnerabilities include one or more misconfigurations, configuration settings that expose weaknesses, potential risks, and possible areas of exploitation.

14. A non-transitory computer-readable medium for storing computer logic having instruction that enable a processor to:
conducting a proactive identity-centric scan of a directory of a network domain by executing Lightweight Directory Access Protocol (LDAP) queries from an endpoint device joined to the domain to enumerate directory schema objects, user accounts, computers, organizational units, and configuration parameters and to identify misconfigurations excessive privileges, or risky entitlements;

computing, from results of the scan, an identity risk posture representing an identity attack-surface visibility for the directory;

guiding an administrator via a user interface by presenting remediation guidance for the identified vulnerabilities, the guidance including one or more of a risk score, a prioritized remediation list, an explanation of potential exploitation paths, or a MITRE ATT&CK mapping, to enable configuration of the directory to reduce the potential security risk; and monitoring the directory in real time for identity-based attacks leveraging the identified vulnerabilities, including high-fidelity detection of at least one of a DCSync attack, a DCShadow attack, Kerberoasting, or LDAP enumeration, and automatically signaling a Zero Trust Network Access (ZTNA) system to contain the attack by blocking a compromised user or endpoint from accessing protected resources.

15. The non-transitory computer-readable medium of claim 14, wherein the non-transitory computer-readable medium is implemented in a user device configured to remotely access the directory via the Zero Trust Network Access (ZTNA) system.

16. An Identity Threat Detection and Response (ITDR) method comprising the steps of:

conducting a proactive identity-centric scan of a directory of a network domain by executing Lightweight Directory Access Protocol (LDAP) queries from an endpoint device joined to the domain to enumerate directory schema objects, user accounts, computers, organizational units, and configuration parameters and to identify misconfigurations excessive privileges, or risky entitlements;

computing, from results of the scan, an identity risk posture representing an identity attack-surface visibility for the directory;

guiding an administrator via a user interface by presenting remediation guidance for the identified vulnerabilities, the guidance including one or more of a risk score, a prioritized remediation list, an explanation of potential exploitation paths, or a MITRE ATT&CK mapping, to enable configuration of the directory to reduce the potential security risk; and monitoring the directory in real time for identity-based attacks leveraging the identified vulnerabilities, including high-fidelity detection of at least one of a DCSync attack, a DCShadow attack, Kerberoasting, or LDAP enumeration, and automatically signaling a Zero Trust Network Access (ZTNA) system to contain the attack by blocking a compromised user or end om accessing protected resources.

17. The method of claim 16, further comprising generating an identity attack-surface map associating each vulnerability with one or more affected users, computers, and directory objects, and classifying each according to a MITRE ATT&CK tactic and severity level.

18. The method of claim 16, wherein guiding the administrator includes displaying remediation guidance comprising step-by-step commands, scripts, or video tutorials to correct the misconfigurations.

19. The method of claim 16, further comprising detecting configuration drift by comparing current directory state data with a baseline posture and identifying deviations introducing new attack paths.

20. The method of claim 16, further comprising instructing a Zero Trust Network Access (ZTNA) system to automatically revoke active user sessions and enforce adaptive access policies responsive to detection of an identity-based attack.

* * * * *